(12) United States Patent
Sensui

(10) Patent No.: US 7,218,457 B2
(45) Date of Patent: May 15, 2007

(54) INTERCHANGEABLE LENS

(75) Inventor: Takayuki Sensui, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/237,744

(22) Filed: Sep. 29, 2005

(65) Prior Publication Data

US 2006/0066951 A1   Mar. 30, 2006

(30) Foreign Application Priority Data

Sep. 20, 2004   (JP) .............................. 2004-289051

(51) Int. Cl.
  G02B 15/14   (2006.01)
  G02B 27/54   (2006.01)
  G02B 9/34    (2006.01)
  G03B 17/00   (2006.01)
  H04N 5/228   (2006.01)

(52) U.S. Cl. ...................... 359/686; 359/557; 359/396; 359/683; 359/686; 359/766; 359/773; 396/52; 396/55; 348/208.11

(58) Field of Classification Search ................ 359/683, 359/686, 766, 773
  See application file for complete search history.

(56) References Cited

U.S. PATENT DOCUMENTS 4,986,643 A    1/1991  Moriyama
6,025,962 A *  2/2000  Suzuki .................... 359/766
6,246,833 B1   6/2001  Harada
6,825,994 B2  11/2004  Harada

FOREIGN PATENT DOCUMENTS

| JP | 2-19814 A     | 1/1990  |
| JP | 2000-231056 A | 8/2000  |
| JP | 2001-272601 A | 10/2001 |
| JP | 2005-284101 A | 10/2001 |
| JP | 2002-090622 A | 3/2002  |
| JP | 2003-322797 A | 11/2003 |

* cited by examiner

Primary Examiner—Ricky Mack
Assistant Examiner—William Choi
(74) Attorney, Agent, or Firm—Miles & Stockbridge PC

(57) ABSTRACT

Providing an interchangeable lens capable of carrying out quick focus from infinity to a close object with a magnification of almost life size by a light-weight moving lens group, exhibiting excellent imaging performance across an entire focusing range, and obtaining excellent imaging performance by a vibration reduction lens and its drive system appropriately arranged even upon vibration reduction. The lens includes a first group having positive power, a second group having negative power, a third group having positive power, and a fourth group having negative power. The fourth group includes a front group having negative power and a rear group having positive power. When the lens is vibrated, the lens corrects image blur by shifting the front group almost perpendicularly to an optical axis. When focusing from infinity to a close object, the first and the front groups are fixed and at least the third group is moved toward the object side.

22 Claims, 16 Drawing Sheets

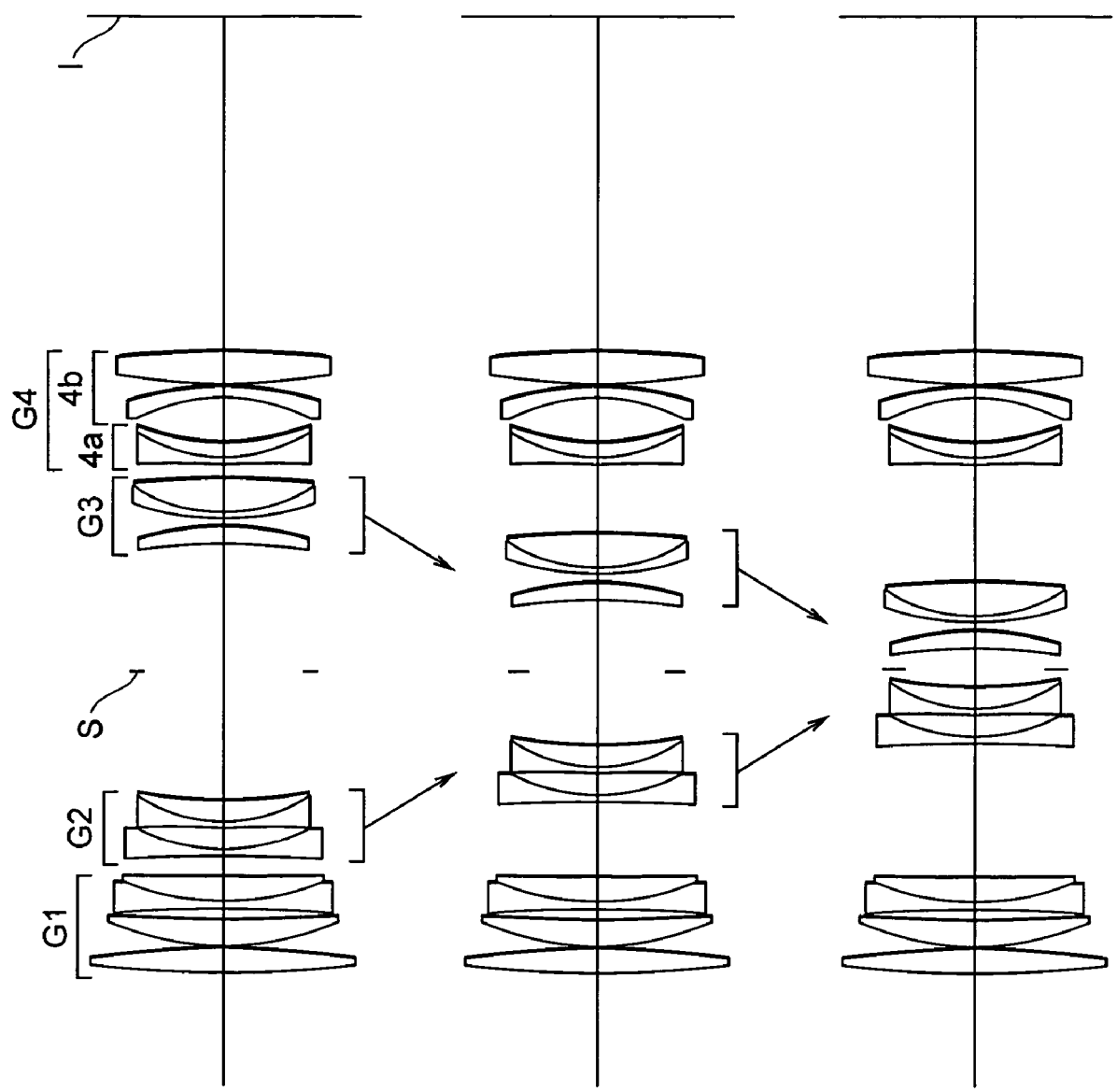

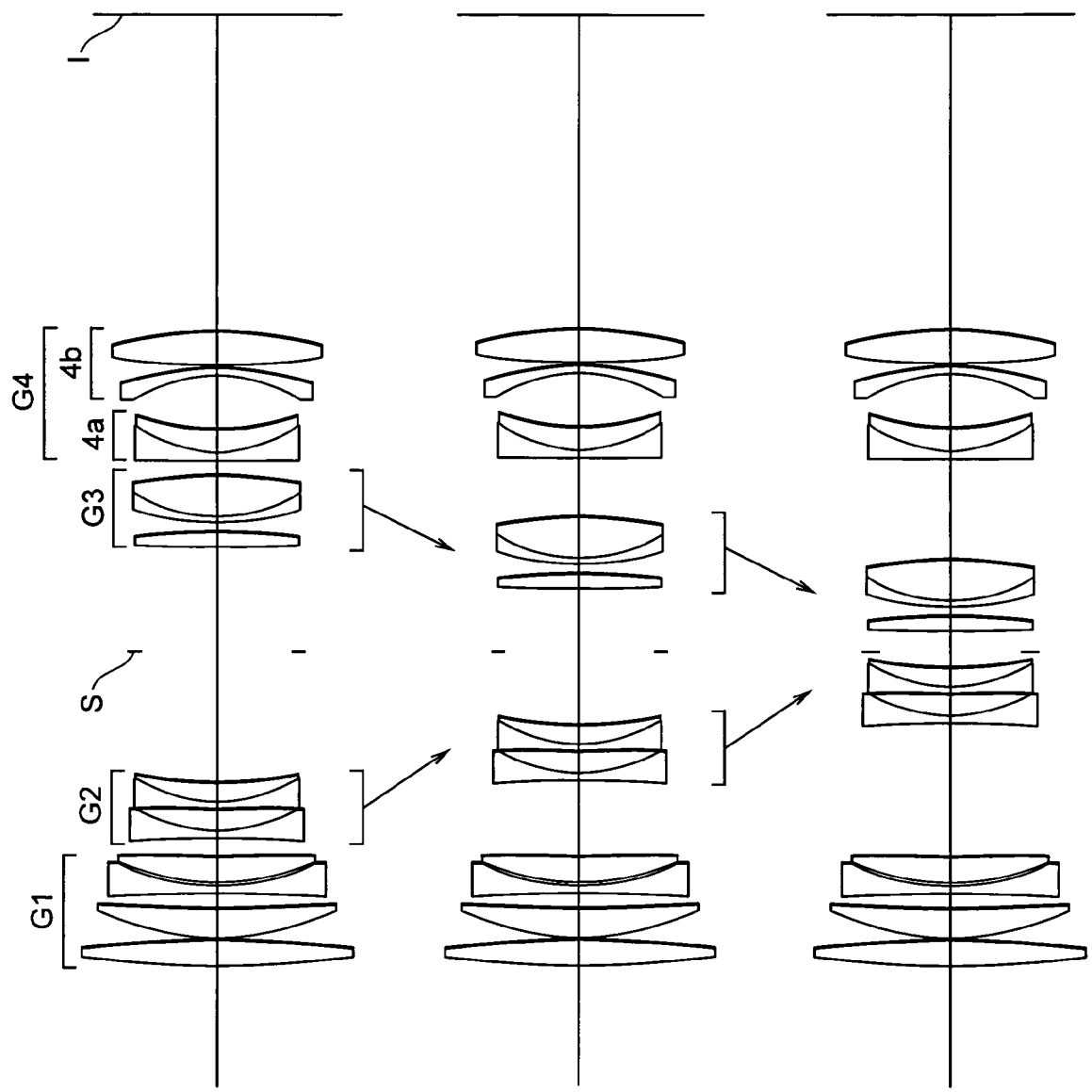

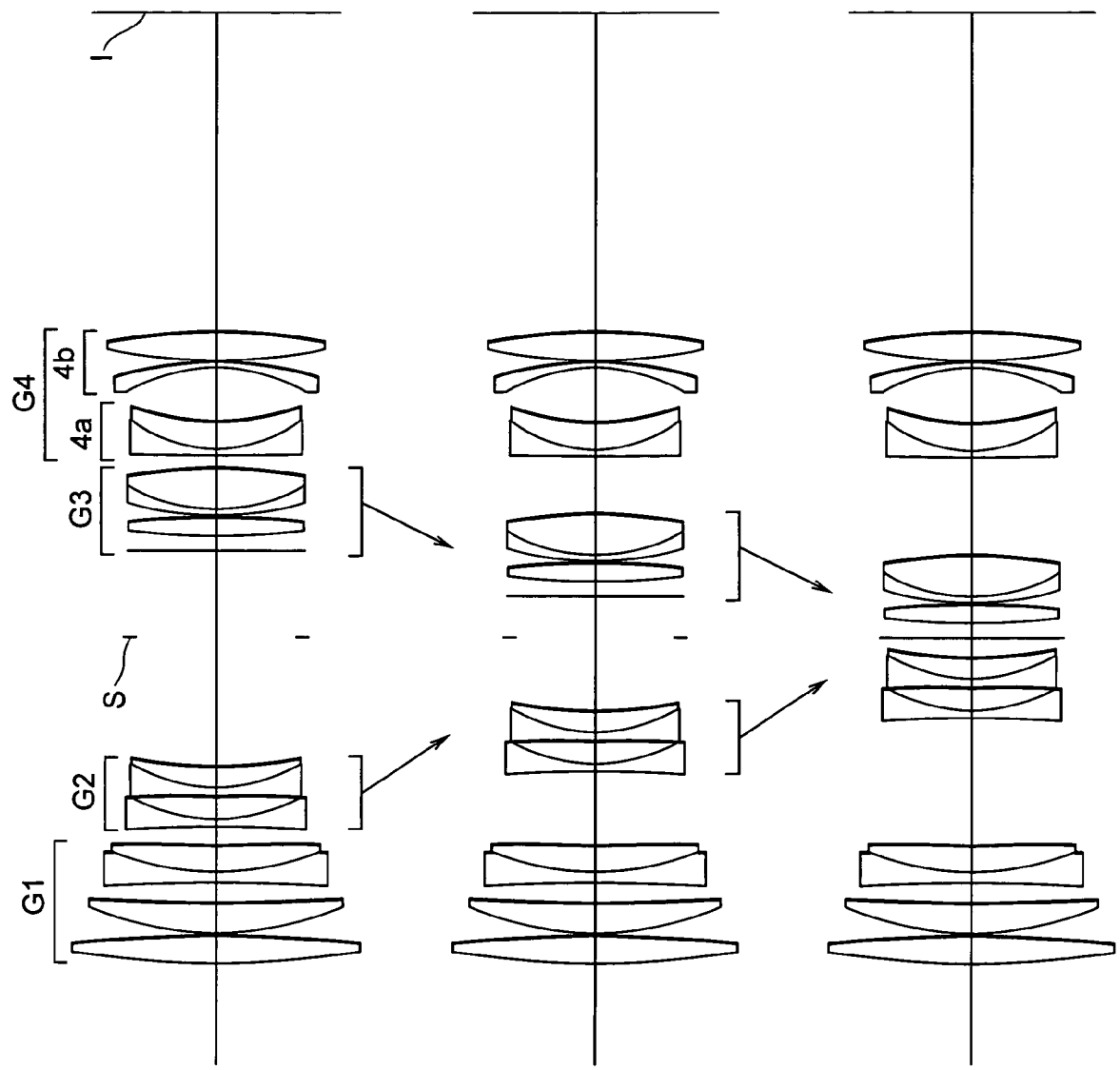

INTERCHANGEABLE LENS

This invention claims the benefit of Japanese Patent application No. 2004-289051 which is hereby incorporated by reference.

BACKGROUND OF THE INVENTION

1. Field of the Invention

The present invention relates to an interchangeable lens.

The present invention relates to an interchangeable lens capable of taking a close-up photography with a shooting magnification of a life size and more specifically to a micro lens having an effect of optically deviating an imaging position so as to correct image blur due to vibrations such as a camera shake, etc.

2. Related Background Art

In a photographic camera, a still video camera and the like, there is what we call a macro lens or a micro lens (hereinafter referred to as a micro lens) as a taking lens used for shooting a close-up object. This micro lens is designed to exhibit higher optical performance especially when photographing the close-up object in comparison with a conventional general-purpose taking lens. Needless to say, many of the micro lenses are used not only for photographing the close-up object but also a wide range of the shooting distance extending from infinity to a close distance.

Generally, the taking lens generates large aberration fluctuation as the shooting distance to objects gets closer and a shooting magnification gets higher, and it becomes difficult to correct the aberrations well. To this end, a so-called floating lens has been proposed to repress the aberration fluctuation at the close distance by moving a plurality of lens groups independently when focusing.

However, with this floating lens, the aberration fluctuation is repressed by greatly moving a large and heavy-weighted lens group when focusing, so that the moving of the lens group does not quite contribute to a change in the shooting magnification. Thus, this lens has a shortcoming, e.g., it is not possible to implement quick focus with a so-called auto-focus camera in which the focusing is driven by a motor and the like.

Then, with consideration to the auto focusing, another floating lens has been proposed for reducing a moving amount of a first lens group. This floating lens, however, has still a lens-system construction for moving the large and heavy-weighted lens group, so this floating lens has a shortcoming in that the effect is not sufficient.

Moreover, these floating lenses have another shortcoming. E.g., for gaining sufficient depth of field at the close-up photography, a shooting is required in a state where the lens has to be stopped down and in many cases, inevitable use of slow shutter speed results in image blur, thereby degrading image quality.

Under these backgrounds, a different floating lens has been proposed that is configured so as not to move the first lens and furthermore provides a function of correcting image blurs (e.g., please see Japan Patent Application Laid-open No. 2001-272601).

However, in the floating lens described in Japan Patent Application Laid-open No. 2001-272601, when actually manufacturing this lens, a vibration reduction lens group cannot be arranged sufficiently distant from a lens mount, so that the vibration reduction lens group cannot be contained in a lens barrel together with a vibration reduction drive system for driving the vibration reduction lens group. Moreover, a large vibration reduction coefficient (vibration reduction sensitivity expressed by a ratio of a shift amount of the vibration reduction lens group to a deviation amount of an image point) becomes necessary. Accordingly, the floating lens described in Japan Patent Application Laid-open No. 2001-272601 has no possibility to be put into practical use.

SUMMARY OF THE INVENTION

The present invention is made in view of the aforementioned problems and has an object to provide an interchangeable lens capable of carrying out quick focus at from infinity to a close distance with a shooting magnification of almost life size by way of a light-weight moving lens group, exhibiting excellent imaging performance across an entire focusing range, and obtaining excellent imaging performance by way of a vibration reduction lens and its drive system appropriately arranged within reason even at the time the vibration reduction is actuated. In order to solve the foregoing problems, the present invention provides an interchangeable lens including, in order from an object side, a first lens group having positive refractive power, a second lens group having negative refractive power, a third lens group having positive refractive power, and a fourth lens group having negative refractive power. The fourth lens group includes, in order from the object side, a front group having negative refractive power and a rear group having positive refractive power. When the interchangeable lens is vibrated, the interchangeable lens corrects image blur by shifting the front group in a direction almost perpendicular to an optical axis. when focusing from infinity to a close object, the first lens group and the front group are fixed and at least the third lens group is moved toward the object side.

In one preferred embodiment of the present invention, the following conditional expression (1) is preferably satisfied:

$$0.75 < f/(-f4) < 1.5 \tag{1}$$

where f denotes a focal length of the overall interchangeable lens system when focusing on an object at infinity, and f4 denotes a focal length of the fourth lens group when focusing on an object at infinity.

In one preferred embodiment of the present invention, the following conditional expression (2) is preferably satisfied:

$$1.90 < f/f3 < 4.0 \tag{2}$$

where f denotes a focal length of the overall interchangeable lens system when focusing on an object at infinity, and f3 denotes a focal length of the third lens group when focusing on an object at infinity.

In one preferred embodiment of the present invention, the following conditional expressions (3) and (4) are preferably satisfied:

$$1.60 < f/(-f4a) < 2.5 \tag{3}$$

$$0.75 < f/f4b < 1.5 \tag{4}$$

where f denotes a focal length of the overall interchangeable lens system when focusing on an object at infinity and f4a denotes a focal length of the front group when focusing on an object at infinity, and f4b denotes a focal length of the rear group when focusing on an object at infinity.

In one preferred embodiment of the present invention, it is preferable that an aperture stop located between the second lens group and the third lens group is further included and the aperture stop is fixed upon focusing.

In one preferred embodiment of the present invention, a diameter of the aperture stop preferably varies upon focusing.

In one preferred embodiment of the present invention, the second lens group is preferably further moved upon focusing from infinity to a close object.

In one preferred embodiment of the present invention, it is preferable that the second lens group is monotonously moved toward an image side and the third lens group is monotonously moved toward the object side upon focusing from infinity to a close object.

In one preferred embodiment of the present invention, the rear group in the fourth lens group is preferably further moved upon focusing from infinity to a close object.

In one preferred embodiment of the present invention, the front group is preferably composed of a cemented lens.

Other features and advantages according to the invention will be readily understood from the detailed description of the preferred embodiment in conjunction with the accompanying drawings.

BRIEF DESCRIPTION OF THE DRAWINGS

FIGS. 1A, 1B and 1C are views showing a lens construction of the interchangeable lens in accordance with Example 1 of the present invention, and FIGS. 1A, 1B and 1C show a focus state relative to an object at infinity, an object at the close distance (1/2×) and an object at the close distance (1/1×) respectively.

FIGS. 5A, 5B and 5C are views showing a lens construction of the interchangeable lens of Example 2 of the present invention and FIGS. 5A, 5B and 5C show a focus state relative to an object at infinity, an object at the close distance (1/2×) and an object at the close distance (1/1×) respectively.

FIGS. 9A, 9B and 9C are views showing a lens construction of the interchangeable lens of Example 3 of the present invention and FIGS. 9A, 9B and 9C show a focus state relative to an object at infinity, an object at the close distance (1/2×) and an object at the close distance (1/1×) respectively.

FIGS. 13A, 13B and 13C show a focus state relative to an object at infinity, an object at the close distance (1/2×) and an object at the close distance (1/1×) respectively.

DESCRIPTION OF THE MOST PREFERRED EMBODIMENTS

Figure 2A:
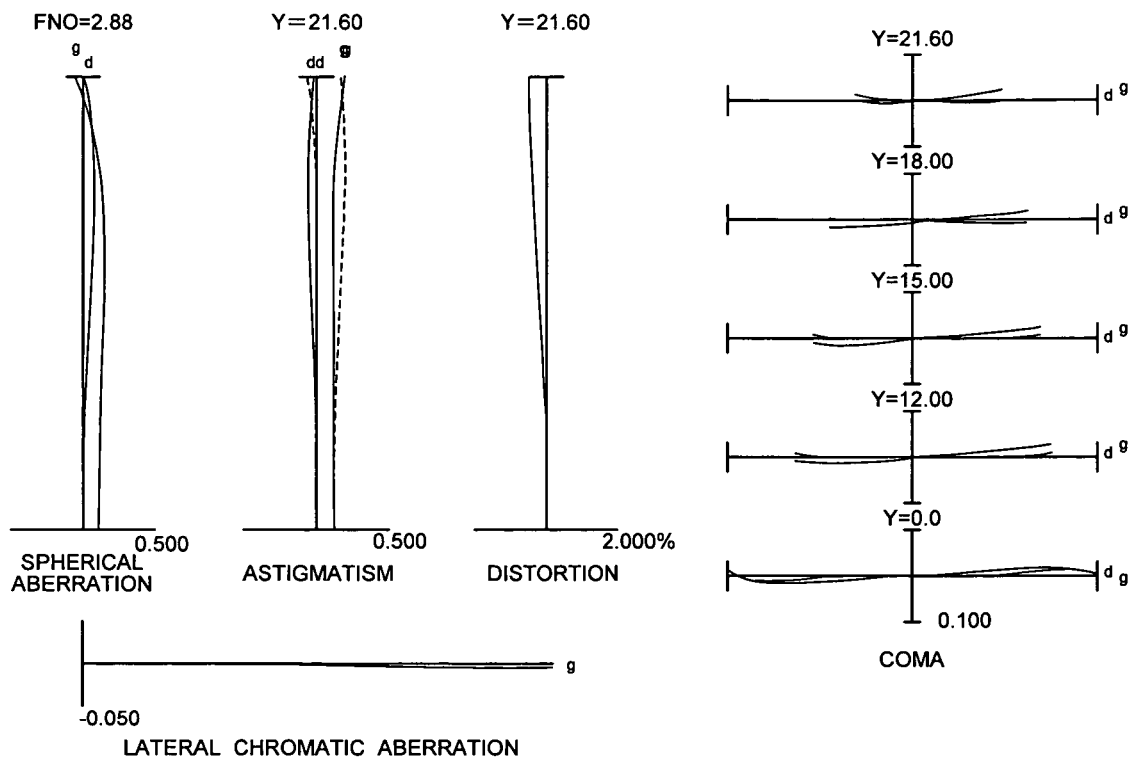
FIGS. 2A and 2B graphically show various aberrations when the interchangeable lens of Example 1 of the present invention is focusing at an infinity and coma when focusing at the infinity upon vibration reduction respectively.

First of all, a vibration reduction system such as an actuator and the like, and focusing will be described to drive a vibration reduction lens group.

It is desired that a location of the vibration reduction drive system from an image plane is the almost same as that of the vibration reduction lens group. To such end, it is desirable that a vibration reduction unit consisting of the vibration reduction lens group and the vibration reduction drive system is not moved from a viewpoint of decrease in weight when focusing. Furthermore, in an interchangeable lens used for a single lens reflex camera requiring back focal length, it is necessary that the vibration reduction lens group is located sufficiently distant from the lens mount, and that the vibration reduction unit is contained in the lens barrel.

Next, the shooting magnification and an effect of the vibration reduction will be described.

When the shooting distance to an object gets closer, a deviation amount of an image becomes greater even if an angle of vibration encountered during photography is the same at the time a macro photography with a higher shooting magnification is taken. Then, in order to obtain a sufficient vibration reduction effect with a small vibration reduction coefficient (the vibration reduction sensitivity expressed by a ratio of the deviation amount of the image point to the shift amount of the vibration reduction lens group), as a large shift amount relative to the vibration reduction lens group is necessary, use of the small vibration reduction coefficient is not preferable. Thus, a macro lens having a vibration reduction function requires a larger vibration reduction coefficient.

A physical relationship between a focusing lens group and the vibration reduction lens group will be described.

With compensating action of shifting the vibration reduction lens group in the direction almost perpendicular to the optical axis, an imaging position can be corrected to a desired position. The shift of the vibration reduction lens group, however, causes various aberrations in the vibration reduction lens group.

Thus, in a case of a lens having a so-called "front side-vibration reduction structure" in which after the lens group on the front side of the vibration reduction lens group counteracts an effect of vibration, this lens group further focuses, the vibration reduction coefficient increases as much as a shooting magnification of the focusing lens group, but at the same time the aberrations also increase. With the front side-vibration reduction structure, as the vibration reduction drive system is arranged on the front side of the lens, the lens structure becomes what is called "a heavy front" and then it is not preferable.

In contrast, with a lens of a so-called "rear side-vibration reduction structure" in which the vibration reduction lens group on the rear side counteracts the effect of vibration after focusing, the above-described heavy front can be avoided and there is no large increase in aberrations due to focusing. Thus, a larger vibration reduction coefficient at the time the close-distance object is taken, and a interval for the actuator and the like to actuate the lens may be secured.

A fluctuation in curvature of field on the image plane will be described.

In a medium telephoto macro lens, in order to maintain good imaging performance all over a wide range of shooting from infinity to the close distance of the shooting magnification with around the life size, it is necessary to suppress a variety of the fluctuation in aberrations beginning with the curvature of field depending upon angle of view due to focusing. To this end, a lens group used for aberration correction is required to be located close to the image plane as much as possible such that an off-axis principal ray passes far from the optical axis as much as possible. The medium telephoto macro lens, however, must avoid the diameter of the lens on the rear side from becoming larger, securing the back focal length. Namely, this means that the vibration reduction lens group should not be located to the front side, and the lens group used for aberration correction should not be located to the front side needlessly.

Now then, the vibration reduction coefficient will be described.

As stated above, the vibration reduction coefficient represents the ratio of the deviation amount of the image point to the shift amount of the vibration reduction lens group, and more specifically, the coefficient is expressed by a difference between a magnification ratio produced by all of the lenses (the lens group having the vibration reduction lens group is also included) between the lens group having the vibration reduction lens group and the image plane and a magnification ratio produced by all of the lenses (the vibration reduction lens group is not included) between the vibration reduction lens group and the image plane.

Taking the above description into consideration, an interchangeable lens of the present invention includes, in order from an object side, a first lens group having positive refractive power, a second lens group having negative refractive power, a third lens group having positive refractive power, and a fourth lens group having negative refractive power. The fourth lens group includes a front group having negative refractive power and a rear group having positive refractive power. The interchangeable lens corrects image blur by shifting the front group in a direction almost perpendicular to the optical axis when an optical system is vibrated. When focusing on objects at from infinity to a close distance, the first lens group and the front group is fixed and at least the third lens group is moved toward the object side. The following conditional expression (1) is satisfied:

$$0.75 < f/(-f4) < 1.5 \tag{1}$$

where f denotes a focal distance of the overall interchangeable lens system when focusing on an object at infinity and f4 denotes a focal length of the fourth lens group when focusing on the object at infinity.

Moreover, an interchangeable lens of another aspect of the present invention includes, in order from an object side, a first lens group having positive refractive power, a second lens group having negative refractive power, a third lens group having positive refractive power, and a fourth lens group having negative refractive power. The fourth lens group includes a front group having negative refractive power and a rear group having positive refractive power. When focusing on objects at from infinity to a close distance, the first lens group and the front group is fixed and at least the third lens group is moved toward the object side. The front group consists of a cemented lens. When the interchangeable lens vibrates, the interchangeable lens corrects image blur by shifting the front group in a direction almost perpendicular to the optical axis.

Furthermore, the interchangeable lens of another aspect of the present invention preferably satisfies a conditional expression (1) as below:

$$0.75 < f/(-f4) < 1.5 \tag{1}$$

where f denotes a focal length of the overall interchangeable lens system when focusing on an object at infinity and f4 denotes a focal length of the fourth lens group when focusing on the object at infinity.

Each of the interchangeable lenses of the present invention with the above-mentioned lens construction locates the front group in the fourth lens group of the vibration reduction lens group to the more image plane side than the third lens group and at the object side as close as possible, and secures a larger interval between the vibration reduction lens group and the rear group in the fourth lens group and a larger vibration reduction coefficient.

According to the interchangeable lens of another aspect of the present invention, the front group in the fourth lens group of the vibration reduction lens group is constructed by a cemented lens, thereby enabling various aberrations and in particular chromatic aberration to be well corrected for even when vibrating.

The described conditional expression (1) defines the refractive power of the fourth lens group, and is to secure the interval used for the vibration reduction unit. Falling below the lower limit of the expression (1), refractive power of the fourth lens group gets too weak. Then, it becomes difficult to secure the back focal length. On the contrary, exceeding the upper limit of the expression (1), refractive power of the fourth lens group gets too strong. Thus, the combined refractive power from the first lens group through the third lens group has to be made strong, but this is not preferable to aberration correction.

The interchangeable lens of the present invention preferably satisfies a conditional expression (2) as below:

$$1.90 < f/f3 < 4.0 \tag{2}$$

where f denotes a focal length of the overall interchangeable lens system when focusing on an object at infinity and f3 denotes a focal length of the third lens group when focusing on the object at infinity.

The described conditional expression (2) defines refractive power of the third lens group, and is to secure the interval used for the vibration reduction unit. Falling below the lower limit of the expression (2), refractive power of the third lens group gets too weak. Thus, the moving amount of the third lens group when focusing gets too strong, and it becomes difficult to secure the sufficient interval for the back focal length and the vibration reduction unit. Also, at the same time, decrease in convergence makes the diameter of the front group in the fourth lens group larger, so that it is not preferable to vibration reduction. On the contrary, exceeding the upper limit of the expression (2), refractive power of the third lens group gets too strong. Thus, the moving amount of the third lens group gets smaller, but spherical aberration produced by the third lens group itself becomes too large. This is not preferable to aberration correction.

It is preferable that the interchangeable lens of the present invention satisfies following conditional expressions (3) and (4);

$$1.60 < f/(-f4a) < 2.5 \quad (3)$$

$$0.75 < f/f4b < 1.5 \quad (4)$$

where f denotes a focal length of the interchangeable lens system when focusing on an object at infinity and f4a denotes a focal length of the front group when focusing on the object at infinity, and f4b denotes a focal length of the rear group when focusing on the object at infinity.

Each of the described conditional expressions (3) and (4) is to secure optical performance and the large vibration reduction coefficient upon vibration reduction.

Falling below the lower limit of the expression (3), refractive power of the front group in the fourth lens group gets too weak. This is preferable to aberration correction, but it becomes difficult to secure both of the large vibration reduction coefficient and the large interval between the front group and the rear group. On the other hand, exceeding the upper limit of the expression (3), refractive power of the front group in the fourth lens group gets too strong. On the contrary to the case in which the refractive power of the front group gets too weak as stated before, optical performance gets degraded especially upon vibration reduction. This is not preferable.

Falling below the lower limit of the expression (4), refractive power of the rear group in the fourth lens group gets too weak. This enables the magnification of the overall fourth lens group to become larger, but also the magnification of the rear group becomes too large. Thus, as the vibration reduction coefficient itself becomes too decreased, it becomes difficult to secure the large vibration reduction coefficient as well as to make the interval between the front group and the rear group large. On the other hand, exceeding the upper limit of the expression (4), refractive power of the rear group in the fourth lens group gets too strong. On the contrary to the case in which the refractive power of the rear group gets too weak as stated before, it becomes difficult to secure the back focal length.

It is preferable that the interchangeable lens of the present invention satisfies a following conditional expression (5);

$$0.75 < -(f/f4a) + (f/f4b) < 1.5 \quad (5)$$

The conditional expression (5) is to secure the large vibration reduction coefficient as well as to make the interval between the front group and the rear group large. Exceeding the upper limit or falling the lower limit of the conditional expression (5), it becomes difficult to achieve both of securing the large vibration reduction coefficient and making the interval large.

Furthermore, it is preferable that the interchangeable lens of the present invention is provided with an aperture stop being fixed and being located between the second lens group and the third lens group when focusing.

When the aperture stop is constructed to be movable, the movable aperture stop is not preferable as its mechanism becomes complicated. Furthermore, when the aperture stop is not provided between the second lens group and the third lens group, a front lens, that is, a diameter of the lens group on the object side of the aperture stop, in particular, the diameter of the lens group closest to the object side becomes larger, and a rear lens, that is, a diameter of the lens group on the image side of the aperture stop, in particular, the diameter of the lens group closest to the image side becomes larger, so that it is not preferable. For example, when the aperture stop is located at the object side of the second lens group, the diameter of the lens group on the image side, for example, the diameter of the fourth lens group becomes larger, so that it is not preferable. Furthermore, e.g., when the aperture stop is located at the image side of the third lens group, the diameter of the lens group on the object side, e.g., the diameter of the first lens group becomes larger, so that it is undesirable.

Moreover, according to the interchangeable lens of the present invention, it is preferable that a diameter of the aperture stop varies when focusing.

When the diameter of the first lens group is determined by a RAND ray at the time the object at infinity is focused, the diameter of the aperture stop becomes small when focusing at the close distance in comparison with when focusing on the object at infinity. Thus, it is necessary to vary the diameter of the aperture stop corresponding to the shooting distance. Namely, if the diameter of the aperture stop is not made small at the close distance, the aperture cannot be determined by the RAND ray. The RAND ray is termed the farthest light beam from the optical axis among a ray reaching image height 0.

Moreover, it is preferable that the interchangeable lens of the present invention is focused by further moving the second lens group when focusing from infinity to the close object.

When the interchangeable lens of the present invention is constructed so as not to move the second lens group, burden when focusing cannot be shared and the shooting magnification at the close distance cannot be made larger, or variation in aberrations upon focusing cannot be made small, such lens construction is not preferable.

Moreover, according to the interchangeable lens of the present invention, it is preferable that the second lens group is moved monotonously toward the image side and the third lens group is moved monotonously toward the object side when focusing from infinity to the close object.

When such lens construction is not employed, it is not preferable since it is impossible to make the lens mechanism simple.

Moreover, it is preferable that the interchangeable lens of the present invention is focused by further moving the rear group in the fourth lens group when focusing from infinity to the close object.

When such lens construction is not employed, it is not preferable since it is impossible to make the fluctuation of the image plane small.

The interchangeable lens of each Example of the present invention will be described below with reference to accompanying drawings.

EXAMPLE 1

FIGS. 1A, 1B and 1C are views showing a lens construction of the interchangeable lens in accordance with Example 1 of the present invention, and show a focus state relative to an object at infinity, an object at the close distance (1/2×) and an object at the close distance (1/1×) respectively.

The interchangeable lens of Example 1 is an intermediate telephoto macro lens that is composed of, in order from an object side, first lens group G1 having positive refractive power, second lens group G2 having negative refractive power, an aperture stop S, third lens group G3 having positive refractive power, and fourth lens group G4 having negative refractive power.

The fourth lens group G4 is composed of, in order from an object side, front group 4a having negative refractive power, and rear group 4b having positive refractive power. Further, front group 4a is composed of a cemented lens consisting of, in order from an object side, a negative meniscus lens with a convex surface facing to the object side and a positive meniscus lens with a convex surface facing to the object side.

According to Example 1, when focusing from infinity to the close object, the first lens group G1 and the fourth lens group G4 are fixed and the second lens group G2 is moved toward the image side monotonously, and the third lens group G3 is moved toward the object side monotonously. Herein, the aperture stop S is provided such that when focusing from infinity to the close object, the aperture stop S is fixed and a diameter of the aperture stop S varies.

Correction to image blur when the overall interchangeable lens of Example 1 vibrates due to a hand shake and the like is carried out by shifting front group 4a in the fourth lens group G4 in a direction almost perpendicular to the optical axis.

Various values of the interchangeable lens according to Example 1 of the present invention are shown below in Table 1.

In [Specifications] of Table 1, f denotes the focal length, FNO denotes an f-number, and NA denotes the maximum aperture of the lens respectively. In [Lens Data], the left most column denotes the surface number counted in order from the object side, the second column shows the radius of curvature of the lens surface, and the third column shows the separation between the adjacent lens surfaces. The fourth and fifth columns respectively show refractive index and Abbe number of the medium relative to d-line ($\lambda$=587.6 nm). In [Variable Separation Data], D0 denotes the distance from the lens surface closest to the object side to the object.

In all of the specifications of each example embodiment below, "mm" is generally used for the unit of length such as the focal length, the radius of curvature, and the other data on the length, the unit of the data is not limit to this since the optical system can provide the same optical performance even if it is proportionally enlarged or reduced.

The same reference symbols in the example embodiment are used in the other embodiments below.

TABLE 1

[Specifications]

| Focusing | ∞ | close object | |
|---|---|---|---|
| f = | 104.00000 | | |
| β = | | −0.50000 | −1.00000 |
| FNO = | 2.88 | | |
| NA = | | 0.13 | 0.11 |

[Lens Data]

| | r | d | n | ν |
|---|---|---|---|---|
| 1 | 177.1848 | 4.2000 | 1.785900 | 44.20 |
| 2 | −147.6575 | 0.1500 | | |
| 3 | 44.9663 | 4.4599 | 1.618000 | 63.38 |
| 4 | 177.1769 | 1.7148 | | |
| 5 | −377.1475 | 1.2000 | 1.728250 | 28.46 |
| 6 | 41.0582 | 0.3086 | | |
| 7 | 45.3583 | 4.2112 | 1.772500 | 49.61 |
| 8 | 4218.8659 | (D8) | | |
| 9 | −265.1019 | 1.2000 | 1.575010 | 41.49 |
| 10 | 28.6668 | 3.4698 | | |
| 11 | 723.3400 | 1.2000 | 1.575010 | 41.49 |
| 12 | 25.1213 | 3.7696 | 1.846660 | 23.78 |
| 13 | 75.7177 | (D13) | | |
| 14 | ∞ | (D14) | Aperture stop S | |
| 15 | −91.0979 | 3.2160 | 1.497000 | 81.61 |
| 16 | −47.2584 | 1.1668 | | |
| 17 | 50.6551 | 1.0000 | 1.846660 | 23.78 |
| 18 | 27.7610 | 5.9381 | 1.696800 | 55.52 |
| 19 | −146.2201 | (D19) | | |
| 20 | 991.4670 | 1.2000 | 1.806100 | 40.94 |
| 21 | 26.4500 | 2.8442 | 1.846660 | 23.78 |
| 22 | 39.4318 | 7.0703 | | |
| 23 | −32.8576 | 2.0000 | 1.570990 | 50.80 |
| 24 | −52.5227 | 0.1500 | | |
| 25 | 82.2313 | 6.0000 | 1.804000 | 46.58 |
| 26 | −142.6686 | (D26) | | |

[Variable Interval Data]

| Focusing | ∞ | close object | |
|---|---|---|---|
| D0 | ∞ | 233.8120 | 145.0000 |
| D8 | 3.00000 | 12.31100 | 22.00000 |
| D13 | 21.98500 | 12.67500 | 3.00000 |
| D14 | 20.81000 | 11.48300 | 3.00000 |
| D19 | 2.00000 | 11.30400 | 19.82400 |
| D26 | 55.73729 | 55.76159 | 55.72268 |

[Values for Conditional Expressions]

f = 104.00
f3 = 44.31
f4 = −129.14
f4a = −48.37
f4b = 101.35
(1) f/(−f4) = 0.81
(2) f/f3 = 2.35
(3) f/(−f4a) = 2.15
(4) f/f4b = 1.03
(5) −((f/f4a) + (f/f4b)) = 1.12

Figure 2B:
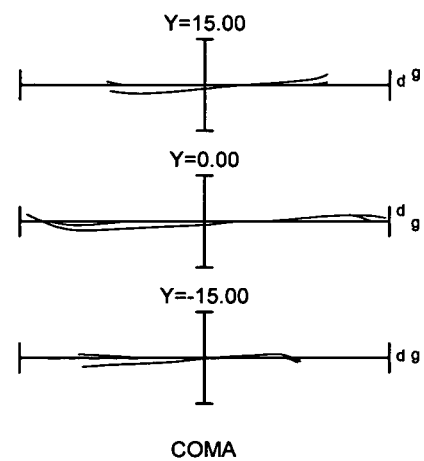

FIGS. 2A and 2B graphically show various aberrations when the interchangeable lens of Example 1 of the present invention is focusing at an infinity and coma when focusing at the infinity upon vibration reduction respectively.

Figure 3A:
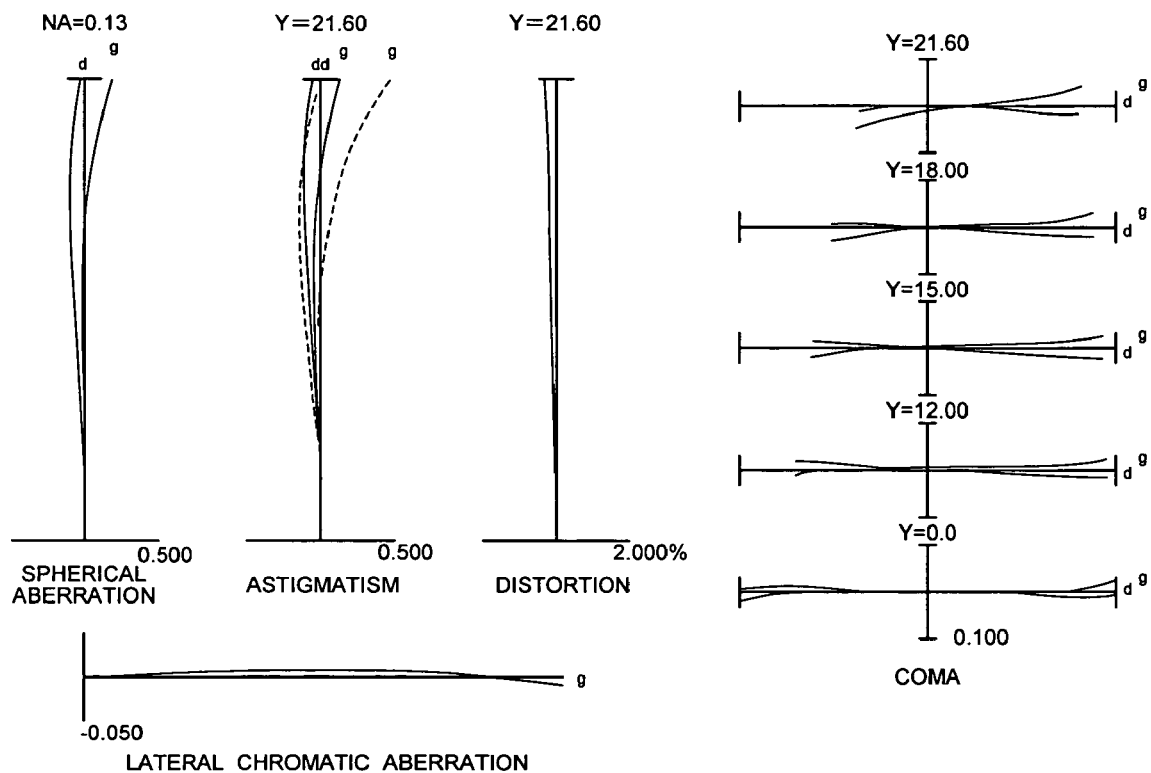
FIGS. 3A and 3B graphically show various aberrations when the interchangeable lens of Example 1 of the present invention is focusing at a close object (1/2×) and coma when focusing at a close object (1/2×) upon vibration reduction respectively.
Figure 3B:
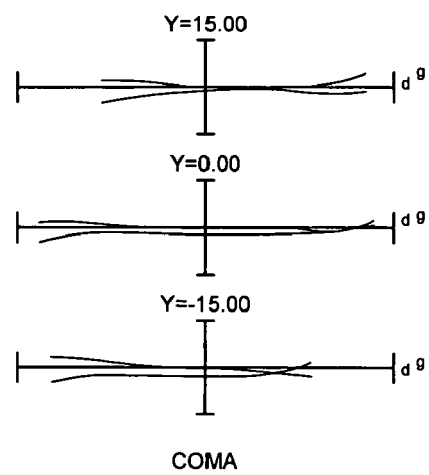

FIGS. 3A and 3B graphically show various aberrations when the interchangeable lens of Example 1 of the present invention is focusing at a close object (1/2×) and coma when focusing at a close object (1/2×) upon vibration reduction respectively.

Figure 4A:
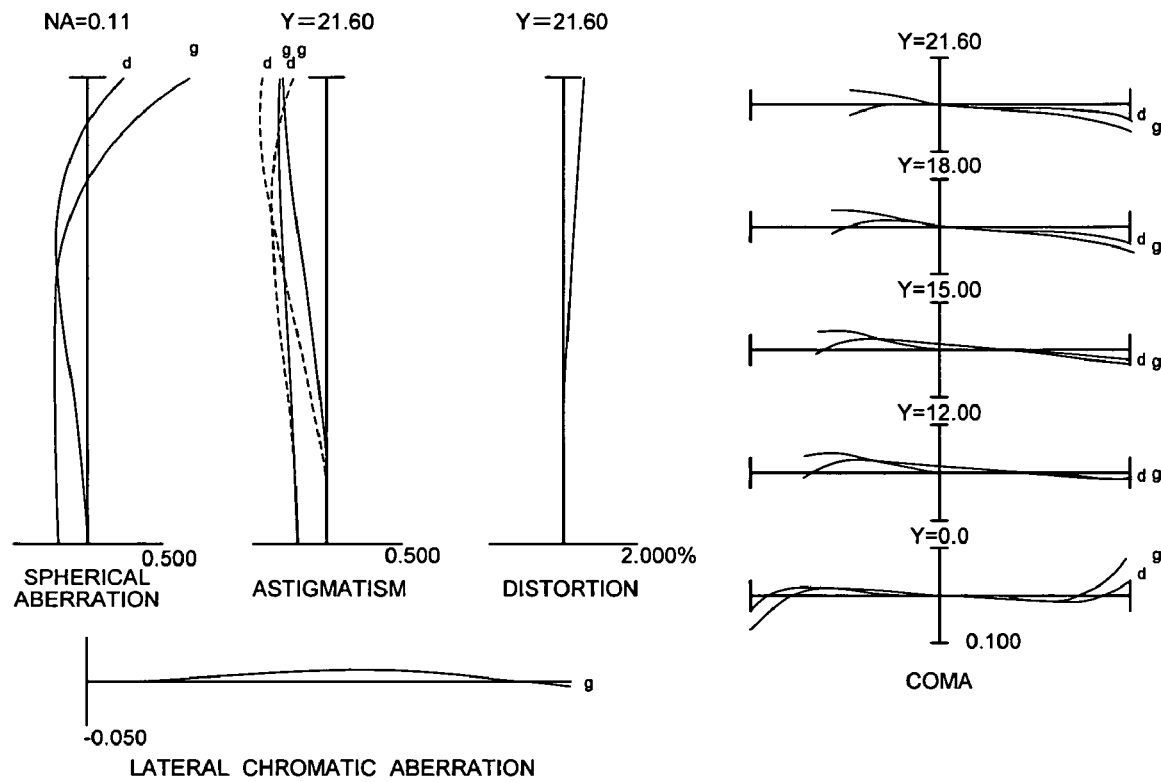
FIGS. 4(a) and 4(b) graphically show various aberrations when the interchangeable lens of Example 1 of the present invention is focusing at a close object (1/1×) and coma when focusing at a close object (1/1×) upon vibration reduction respectively.
Figure 4B:
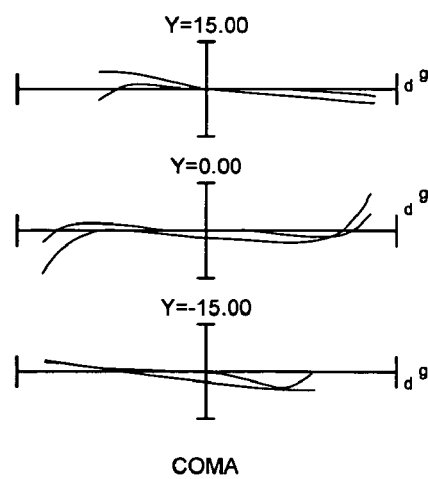

FIGS. 4A and 4B graphically show various aberrations when the interchangeable lens of Example 1 of the present invention is focusing at a close object (1/1×) and coma when focusing at a close object (1/1×) upon vibration reduction respectively.

In respective graphs, FNO denotes the f-number, NA denotes the value at the maximum aperture, and Y denotes the image height respectively. Furthermore, in the graph showing astigmatism and distortion, image height Y denotes maximum values respectively. Moreover, d and g denote respective aberration curves at d-line ($\lambda$=587.6 nm) and g-line ($\lambda$=435.8 nm).

In the graph showing spherical aberration, FNO and NA denote the f-number and the value at the maximum aperture corresponding to the maximum aperture. Furthermore, in the graph showing astigmatism, a solid line denotes a sagittal image plane and a broken line denotes a meridional image plane respectively.

The same reference symbols in the preferred embodiment are used in other graphs showing various aberrations of each example embodiment as below.

Each graph showing various aberrations tells that the interchangeable lens of Example 1 provides excellent imaging performance across the entire focusing range from infinity to a close distance of around the life size, and also excellent imaging performance even when the vibration reduction is activated.

EXAMPLE 2

FIGS. 5A, 5B and 5C are view showing a lens construction of the interchangeable lens according to Example 2 of the present invention and show a focus state relative to an object at infinity, an object at the close distance (1/2×) and an object at the close distance (1/1×) respectively.

An interchangeable lens according to Example 2 of the present invention is an intermediate telephoto macro lens that is composed of, in order from an object side, a first lens group G1 having positive refractive power, a second lens group G2 having negative refractive power, an aperture stop S, a third lens group G3 having positive refracting power, and a fourth lens group G4 having negative refractive power.

The fourth lens group G4 is composed of, in order from the object side, a front group 4a having negative refractive power, and a rear group 4b having positive refracting power. Furthermore, the front group 4a is composed of a cemented lens consisting of, in order from the object side, a negative meniscus lens with a convex surface facing to the object side, and a positive meniscus lens with a convex surface facing to the object side.

According to the example preferred embodiment, when focusing from infinity to a close object, the first lens group G1 and fourth lens group G4 are fixed and second lens group G2 is moved toward the image side monotonously and the third lens group G3 is moved toward the object side monotonously. Herein, the aperture stop S is provided such that when focusing from infinity to a close object, the aperture stop S is fixed, and a diameter of the aperture varies.

Correction to image blurs when the overall interchangeable lens of Example 2 vibrates due to a hand shake and the like is carried out by shifting front group 4a in the fourth lens group G4 in a direction almost perpendicular to the optical axis.

Various values of the interchangeable lens according to Example 2 of the present invention are shown below in Table 2.

TABLE 2

[specifications]

| Focusing | ∞ | close object | |
|---|---|---|---|
| f = | 104.00000 | | |
| β = | | −0.50000 | −1.00000 |
| FNO = | 2.88 | | |
| NA = | | 0.14 | 0.11 |

[Lens Data]

| | r | d | n | ν |
|---|---|---|---|---|
| 1 | 168.5648 | 4.4715 | 1.772500 | 49.61 |
| 2 | −156.6897 | 0.1505 | | |
| 3 | 48.3087 | 5.1284 | 1.603110 | 60.68 |
| 4 | 304.7461 | 2.1235 | | |
| 5 | −324.3150 | 1.4000 | 1.717360 | 29.52 |
| 6 | 37.1274 | 0.4974 | | |
| 7 | 40.1172 | 4.6009 | 1.772500 | 49.61 |
| 8 | −2956.5147 | (D8) | | |
| 9 | −160.9645 | 1.2000 | 1.548140 | 45.79 |
| 10 | 28.4447 | 3.6735 | | |
| 11 | −502.5095 | 1.2000 | 1.548140 | 45.79 |
| 12 | 26.1132 | 3.3653 | 1.846660 | 23.78 |
| 13 | 71.4603 | (D13) | | |
| 14 | ∞ | (D14) | Aperture stop S | |
| 15 | 223.5265 | 2.5514 | 1.589130 | 1.18 |
| 16 | −133.7526 | 1.5782 | | |
| 17 | 50.9389 | 1.0000 | 1.846660 | 23.78 |
| 18 | 26.6817 | 6.9945 | 1.618000 | 63.38 |
| 19 | −74.6342 | (D19) | | |
| 20 | 1999.9482 | 1.2000 | 1.785900 | 44.20 |
| 21 | 22.3529 | 4.0000 | 1.805180 | 25.43 |
| 22 | 36.5592 | 9.0558 | | |
| 23 | −26.3044 | 1.2000 | 1.531720 | 48.87 |
| 24 | −49.6316 | 0.1500 | | |
| 25 | 96.2104 | 5.9113 | 1.772500 | 49.61 |
| 26 | −71.5105 | (D26) | | |

[Variable Interval Data]

| Focusing | ∞ | close object | |
|---|---|---|---|
| D0 | ∞ | 238.7690 | 147.2773 |
| D8 | 3.00000 | 12.69500 | 21.99600 |
| D13 | 21.99700 | 12.30300 | 3.00000 |
| D14 | 17.55400 | 10.30800 | 3.00000 |
| D19 | 2.35900 | 9.60500 | 16.91500 |
| D26 | 52.48372 | 52.48194 | 52.48113 |

[Values for Conditional Expressions]

f = 104.00
f3 = 47.42
f4 = −136.12
f4a = −52.53
f4b = 106.02
(1)f/(−f4) = 0.76
(2)f/f3 = 2.20
(3)f/(−f4a) = 1.98
(4)f/f4b = 0.98
(5)−((f/f4a) + (f/f4b)) = 1.00

Figure 6A:
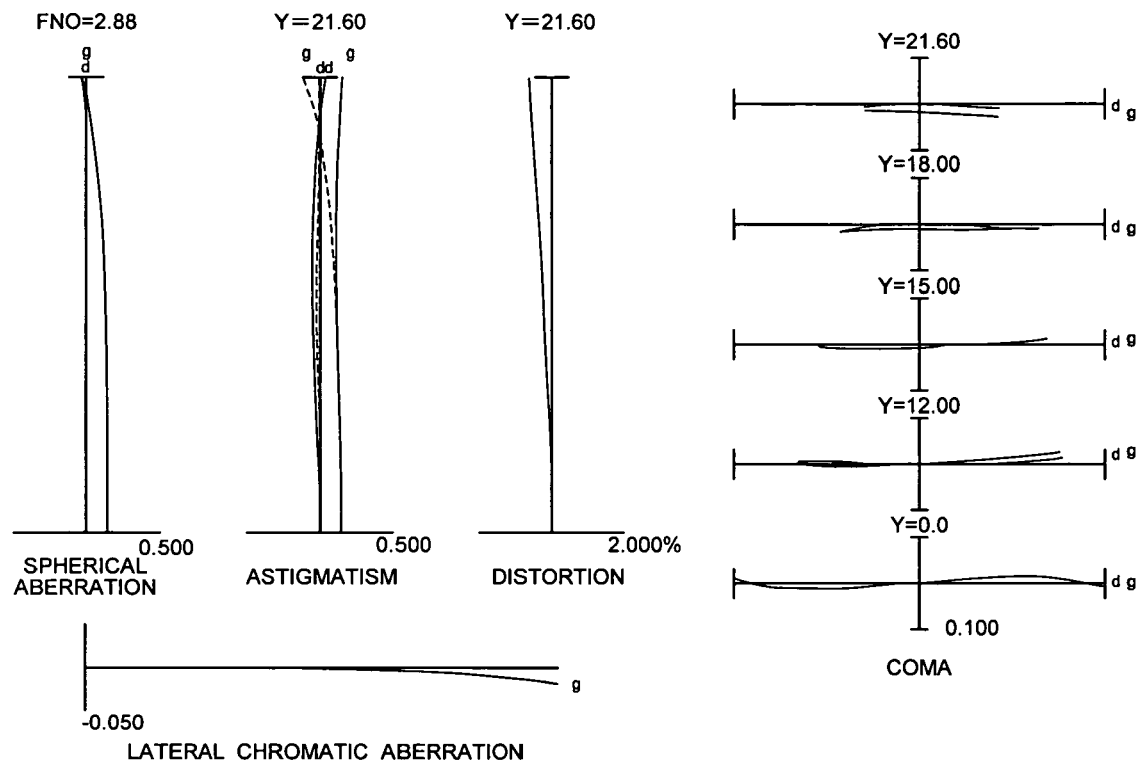
FIGS. 6A and 6B graphically show various aberrations when the interchangeable lens of Example 2 of the present invention is focusing at an infinity and coma when focusing at the infinity upon vibration reduction respectively.
Figure 6B:
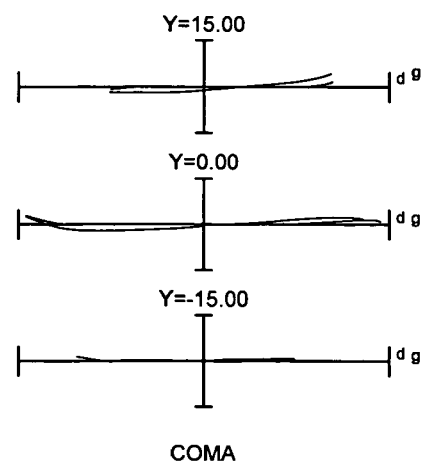

FIGS. 6A and 6B graphically show various aberrations when the interchangeable lens of Example 2 of the present invention is focusing at an infinity and coma when focusing at the infinity upon vibration reduction respectively.

Figure 7A:
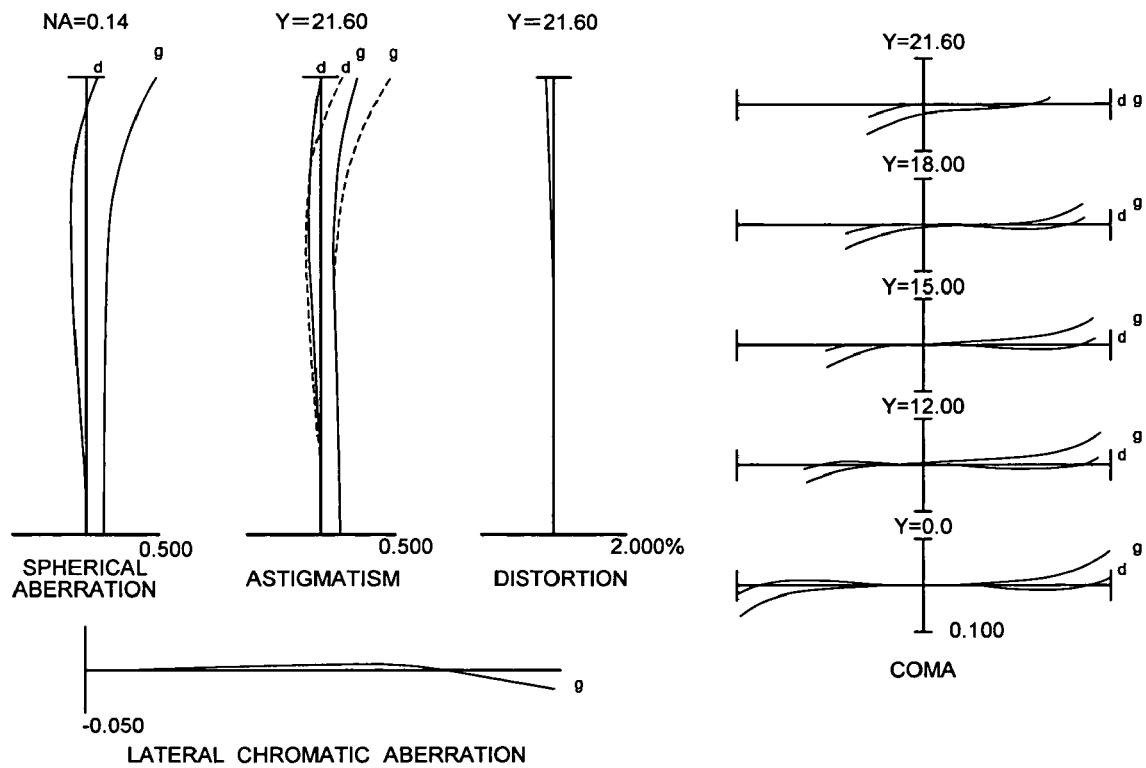
FIGS. 7A and 7B graphically show various aberrations when the interchangeable lens of Example 2 of the present invention is focusing at a close object (1/2×) and coma when focusing at a close object (1/2×) upon vibration reduction respectively.
Figure 7B:
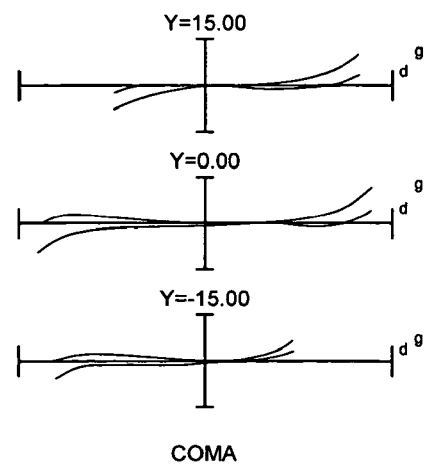

FIGS. 7A and 7B graphically show various aberrations when the interchangeable lens of Example 2 of the present invention is focusing at a close object (1/2×) and coma when focusing at a close object (1/2×) upon vibration reduction respectively.

Figure 8A:
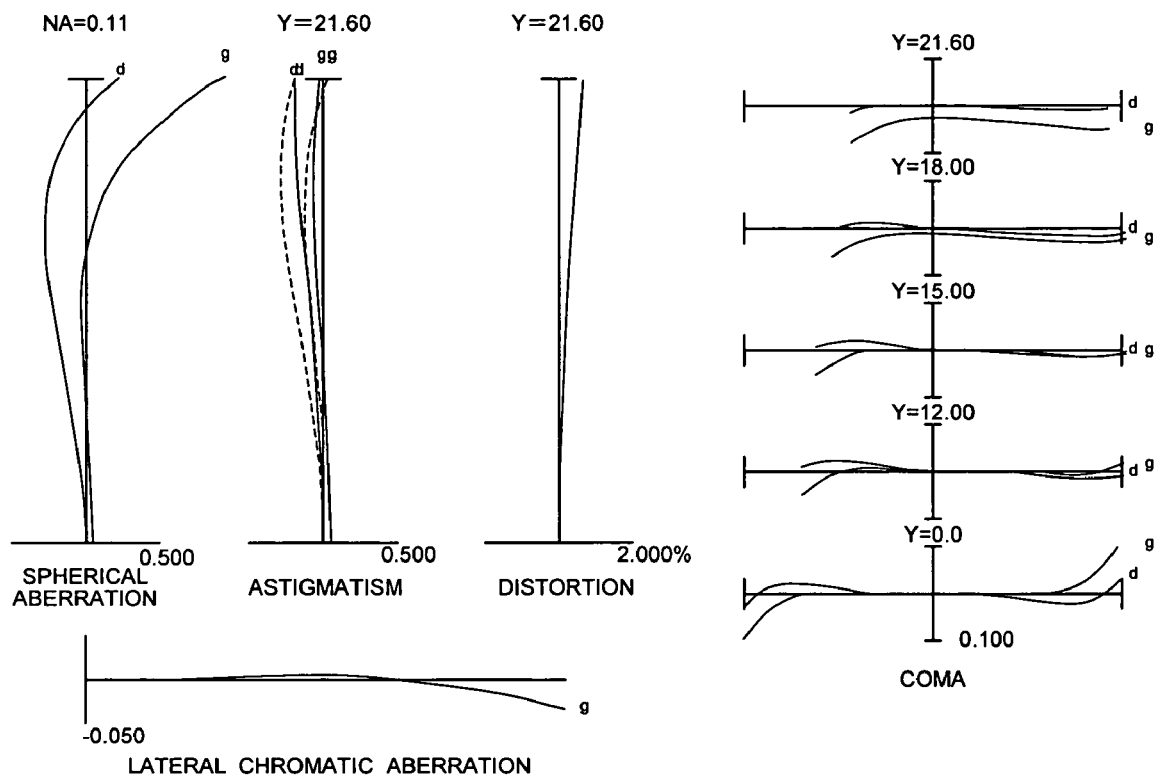
FIGS. 8A and 8B graphically show various aberrations when the interchangeable lens of Example 2 of the present invention is focusing at a close object (1/1×) and coma when focusing at a close object (1/1×) upon vibration reduction respectively.
Figure 8B:
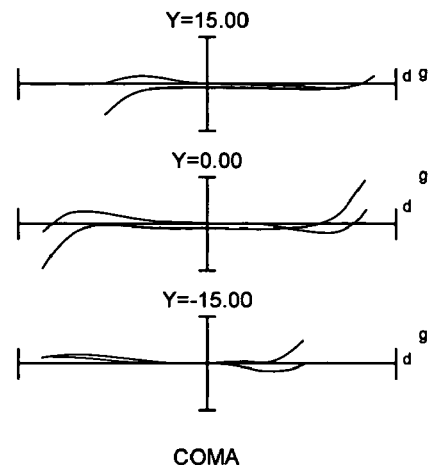

FIGS. 8A and 8B graphically show various aberrations when the interchangeable lens of Example 2 of the present invention is focusing at a close object (1/1×) and coma when focusing at a close object (1/1×) upon vibration reduction respectively.

Each graph showing various aberrations tells that the interchangeable lens of Example 2 provides excellent imaging performance across the entire focusing range from infinity to a close distance of around the life size, and also excellent imaging performance even when the vibration reduction is activated.

EXAMPLE 3

FIGS. 9A, 9B and 9C are views showing a lens construction of the interchangeable lens of Example 3 of the present invention and show a focus state relative to an object at infinity, an object at the close distance (1/2×) and an object at the close distance (1/1×) respectively.

An interchangeable lens according to Example 3 of the present invention is an intermediate telephoto macro lens that is composed of, in order from an object side, a first lens group G1 having positive refractive power, a second lens group G2 having negative refractive power, an aperture stop S, a third lens group G3 having positive refracting power, and a fourth lens group G4 having negative refractive power.

The fourth lens group G4 is composed of, in order from the object side, a front group 4a having negative refractive power, and a rear group 4b having positive refracting power. Furthermore, the front group 4a is composed of a cemented lens consisting of, in order from the object side, a negative meniscus lens with a convex surface facing to the object side, and a positive meniscus lens with a convex surface facing to the object side.

According to Example 3, when focusing from infinity to a close object, the first lens group G1 and fourth lens group G4 are fixed, and the second lens group G2 is moved toward the image side monotonously and the third lens group G3 is moved toward the object side monotonously. Herein, the aperture stop S is provided such that when focusing from infinity to the close object the aperture stop S is fixed and a diameter of the aperture varies.

Correction to image blurs when the overall interchangeable lens of Example 3 vibrates due to a hand shake and the like is carried out by shifting the front group 4a in the fourth lens group G4 in a direction almost perpendicular to the optical axis.

Various values of the interchangeable lens according to Example 3 of the present invention are shown below in Table 3.

TABLE 3

[specifications]

| Focusing | ∞ | close object | |
|---|---|---|---|
| f = | 104.00000 | | |
| β = | | −0.50000 | −1.00000 |
| FNO = | 2.88 | | |
| NA = | | 0.14 | 0.11 |

[Lens Data]

| | r | d | n | ν |
|---|---|---|---|---|
| 1 | 135.4810 | 4.8268 | 1.772500 | 49.61 |
| 2 | −190.5454 | 0.2000 | | |
| 3 | 49.7250 | 5.0443 | 1.612720 | 58.75 |
| 4 | 328.1282 | 3.2512 | | |
| 5 | −301.4048 | 1.3000 | 1.717360 | 29.52 |
| 6 | 36.6648 | 0.2601 | | |

TABLE 3-continued

| 7 | 39.1876 | 5.0203 | 1.772500 | 49.61 |
|---|---|---|---|---|
| 8 | ∞ | (D8) | | |
| 9 | −184.4593 | 1.1000 | 1.582670 | 46.43 |
| 10 | 27.3895 | 4.0524 | | |
| 11 | −173.3863 | 1.2519 | 1.531720 | 48.87 |
| 12 | 26.3938 | 4.0212 | 1.805180 | 25.43 |
| 13 | 89.6909 | (D13) | | |
| 14 | ∞ | (D14) | Aperture stop S | |
| 15 | 0.0000 | 2.4681 | | |
| 16 | 114.4253 | 3.0007 | 1.497000 | 81.61 |
| 17 | −114.4253 | 0.1500 | | |
| 18 | 52.1409 | 1.1283 | 1.846660 | 23.78 |
| 19 | 26.5640 | 6.9913 | 1.620410 | 60.29 |
| 20 | −77.9021 | (D20) | | |
| 21 | 754.4676 | 1.1000 | 1.806100 | 40.94 |
| 22 | 21.4197 | 4.8050 | 1.805180 | 25.43 |
| 23 | 37.4268 | 8.8210 | | |
| 24 | −27.1640 | 1.1000 | 1.518230 | 58.96 |
| 25 | −51.2200 | 0.1500 | | |
| 26 | 88.6706 | 4.9019 | 1.785900 | 44.20 |
| 27 | −88.6706 | (D27) | | |

[Variable Interval Data]

| Focusing | ∞ | close object | |
|---|---|---|---|
| D0 | ∞ | 240.7350 | 151.4870 |
| D8 | 3.00000 | 12.24700 | 21.28900 |
| D13 | 21.44900 | 12.20300 | 3.16000 |
| D14 | 14.48400 | 6.96500 | 0.00000 |
| D20 | 2.00000 | 9.51900 | 16.48400 |
| D27 | 53.12017 | 52.48194 | 52.48113 |

[Values for Conditional Expressions]

f = 104.00
f3 = 42.34
f4 = −115.34
f4a = −48.82
f4b = 109.05
(1)f/(−f4) = 0.90
(2)f/f3 = 2.46
(3)f/(−f4a) = 2.13
(4)f/f4b = 0.95
(5)−((f/f4a) + (f/f4b)) = 1.18

Figure 10A:
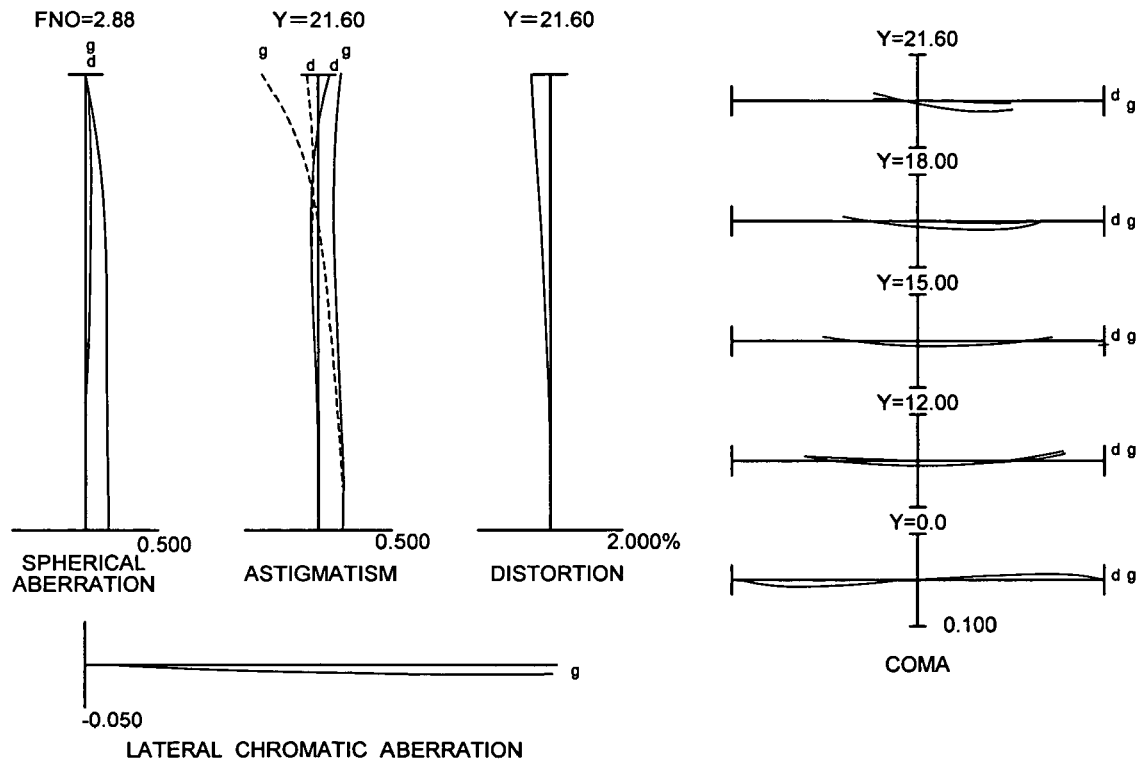
FIGS. 10A and 10B graphically show various aberrations when the interchangeable lens of Example 3 of the present invention is focusing at an infinity and coma when focusing at the infinity upon vibration reduction respectively.
Figure 10B:
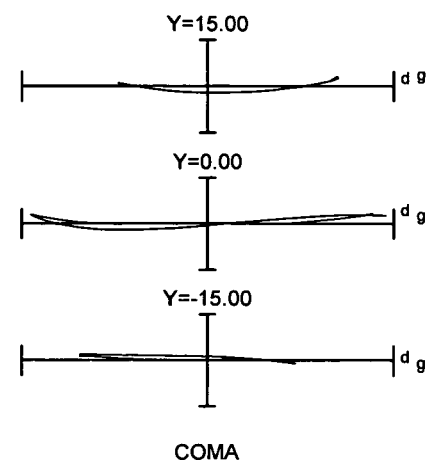

FIGS. 10A and 10B graphically show various aberrations when the interchangeable lens of Example 3 of the present invention is focusing at an infinity and coma when focusing at the infinity upon vibration reduction respectively.

Figure 11A:
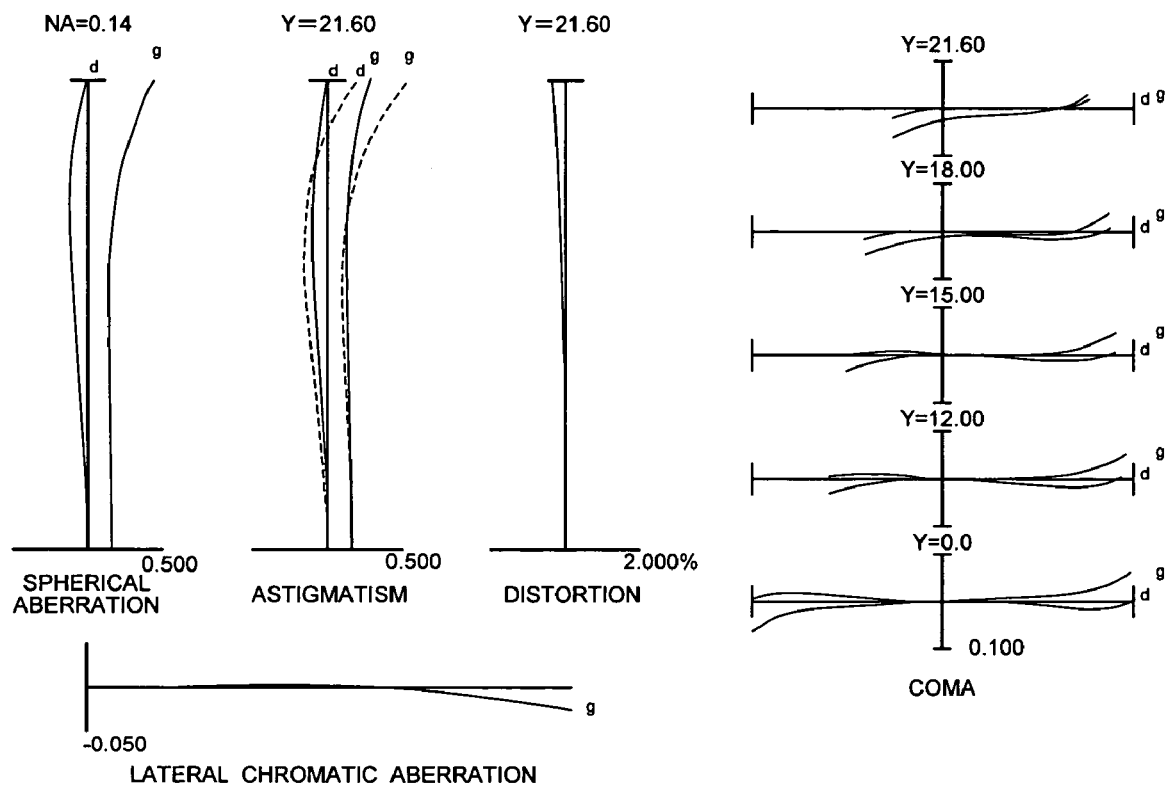
FIGS. 11A and 11B graphically show various aberrations when the interchangeable lens of Example 3 of the present invention is focusing at a close object (1/2×) and coma when focusing at a close object (1/2×) upon vibration reduction respectively.
Figure 11B:
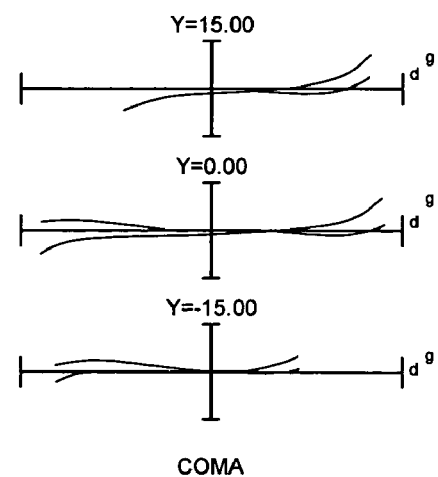

FIGS. 11A and 11B graphically show various aberrations when the interchangeable lens of Example 3 of the present invention is focusing at a close object (1/2×) and coma when focusing at a close object (1/2×) upon vibration reduction respectively.

Figure 12A:
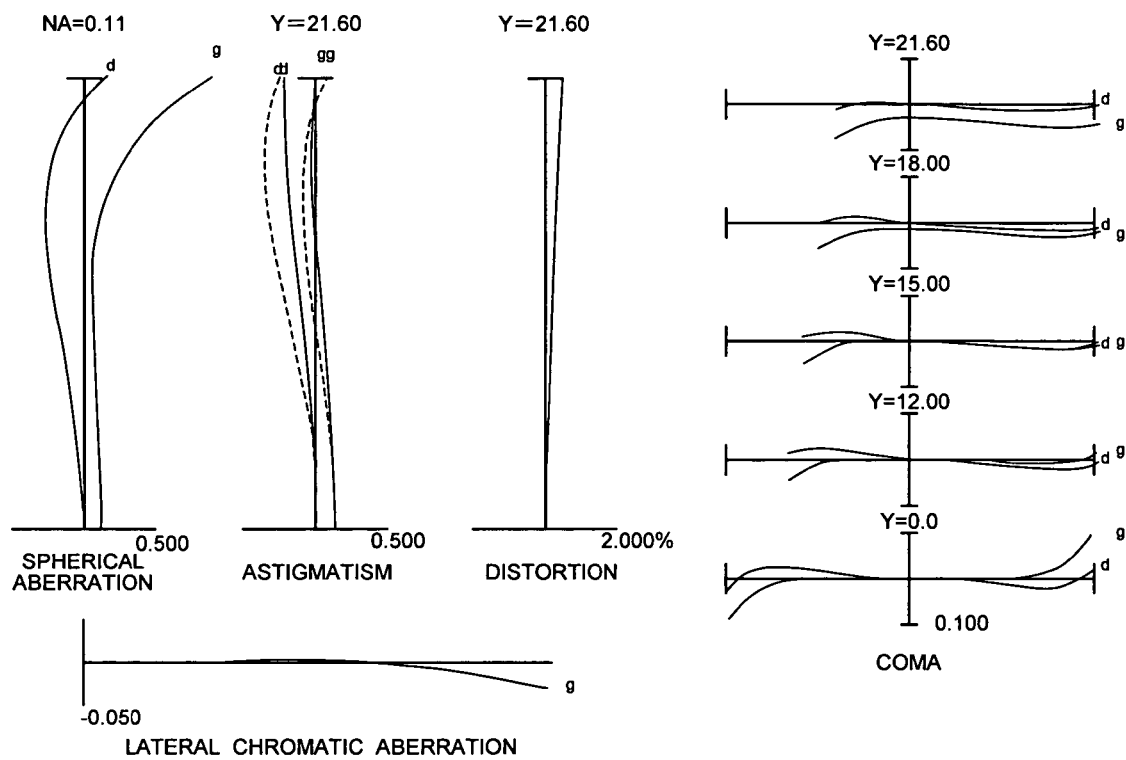
FIGS. 12A and 12B graphically show various aberrations when the interchangeable lens of Example 3 of the present invention is focusing at a close object (1/1×) and coma when focusing at a close object (1/1×) upon vibration reduction respectively.
Figure 12B:
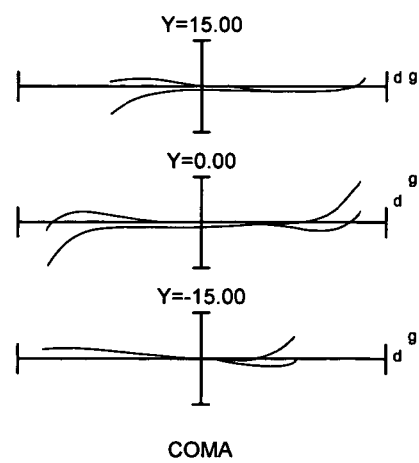

FIGS. 12A and 12B graphically show various aberrations when the interchangeable lens of Example 3 of the present invention is focusing at a close object (1/1×) and coma when focusing at a close object (1/1×) upon vibration reduction respectively.

Each graph showing various aberrations tells that the interchangeable lens of Example 3 provides excellent imaging performance across the entire focusing range from infinity to a close distance of around the life size, and also excellent imaging performance even when the vibration reduction is activated.

EXAMPLE 4

Figures 13A, 13B, 13C:
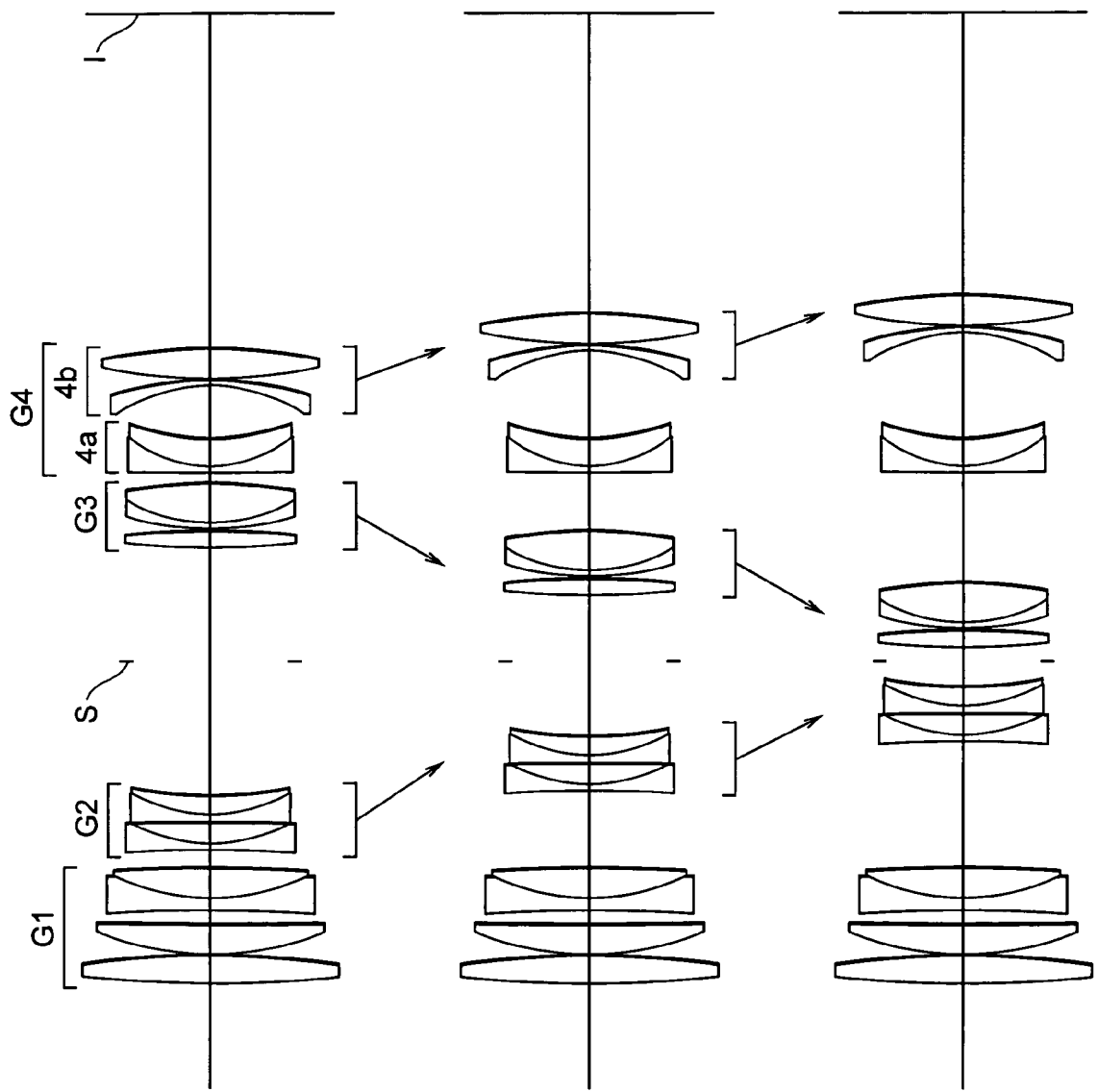
FIGS. 13A, 13B and 13C are views showing a lens construction of the interchangeable lens of Example 4 of the present invention

FIGS. 13A, 13B and 13C are views showing a lens construction of the interchangeable lens of Example 4 of the present invention and show a focus state relative to an object at infinity, an object at the close distance (1/2×) and an object at the close distance (1/1×) respectively.

An interchangeable lens according to Example 4 of the present invention is an intermediate telephoto macro lens that is composed of, in order from an object side, a first lens group G1 having positive refractive power, a second lens group G2 having negative refractive power, an aperture stop S, a third lens group G3 having positive refracting power, and a fourth lens group G4 having negative refractive power.

The fourth lens group G4 includes, in order from the object side, a front group 4a having negative refractive power, and a rear group 4b having positive refractive power. Furthermore, the front group 4a is composed of a cemented lens consisting of, in order from the object side, a negative meniscus lens with a convex surface facing to the object side, and a positive meniscus lens with a convex surface facing to the object side.

According to Example 4, when focusing from infinity to a close object, the first lens group G1 and the fourth lens group G4 are fixed and the second lens group G2 is moved toward the image side monotonously, the third lens group G3 is moved toward the object side monotonously and the rear group in the fourth lens group G4 is moved toward the image side. Herein, the aperture stop S is provided such that when focusing from infinity to the close object, the aperture stop S is fixed and a diameter of the aperture stop varies.

Correction to image blurs when the overall interchangeable lens of Example 4 vibrates due to a hand shake and the like is carried out by shifting the front group 4a in the fourth lens group G4 in a direction almost perpendicular to the optical axis.

Various values of the interchangeable lens according to Example 4 of the present invention are shown below in Table 4.

TABLE 4

[specifications]

| Focusing | ∞ | close object | |
|---|---|---|---|
| f = | 102.38000 | | |
| β = | | −0.50000 | −1.00000 |
| FNO = | 2.88 | | |
| NA = | | 0.14 | 0.11 |

[Lens Data]

| | r | d | n | ν |
|---|---|---|---|---|
| 1 | 151.1851 | 4.8825 | 1.772500 | 49.61 |
| 2 | −161.3045 | 0.2724 | | |
| 3 | 52.8352 | 4.8657 | 1.618000 | 63.38 |
| 4 | 412.8855 | 2.2852 | | |
| 5 | −300.4394 | 2.0000 | 1.717362 | 29.51 |
| 6 | 37.9461 | 0.1799 | | |
| 7 | 39.7936 | 4.9121 | 1.772500 | 49.61 |
| 8 | 2569.2189 | (D8) | | |
| 9 | −149.5993 | 1.1000 | 1.561285 | 49.01 |
| 10 | 30.1724 | 3.6188 | | |
| 11 | −199.0068 | 1.1000 | 1.520000 | 55.25 |
| 12 | 28.2478 | 3.4512 | 1.805180 | 25.43 |
| 13 | 74.5659 | (D13) | | |
| 14 | ∞ | (D14) | Aperture stop S | |
| 15 | 144.2612 | 2.9630 | 1.497000 | 81.61 |
| 16 | −98.8652 | 0.1500 | | |
| 17 | 51.3287 | 1.1000 | 1.846660 | 23.78 |
| 18 | 28.4505 | 6.3296 | 1.620410 | 60.29 |
| 19 | −98.1398 | (D19) | | |
| 20 | 516.4665 | 1.1000 | 1.806100 | 40.94 |
| 21 | 23.2053 | 4.9732 | 1.805180 | 25.43 |
| 22 | 40.3278 | (D22) | | |
| 23 | −32.4513 | 1.4000 | 1.519035 | 49.27 |

TABLE 4-continued

| 24 | −60.0882 | 0.1500 | | |
|---|---|---|---|---|
| 25 | 98.1035 | 4.7376 | 1.806916 | 46.41 |
| 26 | −115.5916 | (D26) | | |

[Variable Interval Data]

| Focusing | ∞ | close object | |
|---|---|---|---|
| D0 | ∞ | 245.2520 | 155.1070 |
| D8 | 3.00000 | 12.94200 | 20.92800 |
| D13 | 22.15900 | 12.21700 | 4.23100 |
| D14 | 19.15840 | 10.83440 | 2.04340 |
| D19 | 2.00000 | 10.32500 | 19.11500 |
| D22 | 7.95400 | 13.71600 | 16.61100 |
| D26 | 55.13700 | 49.48383 | 46.75996 |

[Values for Conditional Expressions]

f = 102.38
f3 = 43.89
f4 = −121.70
f4a = −54.52
f4b = 122.00
(1)f/(−f4) = 0.84
(2)f/f3 = 2.33
(3)f/(−f4a) = 1.87
(4)f/f4b = 0.84
(5)−((f/f4a) + (f/f4b)) = 1.03

Figure 14A:
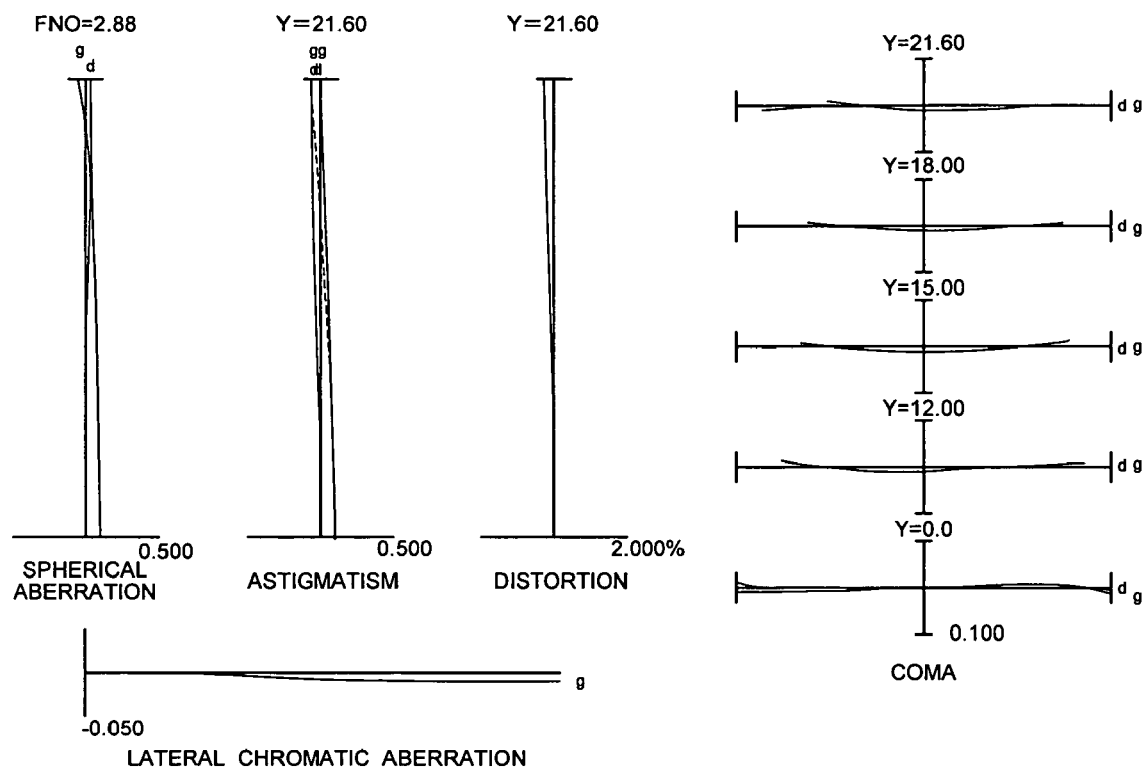
FIGS. 14A and 14B graphically show various aberrations when the interchangeable lens of Example 4 of the present invention is focusing at an infinity and coma when focusing at the infinity upon vibration reduction respectively.
Figure 14B:
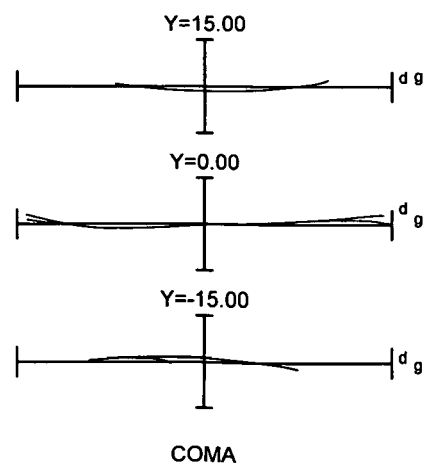

FIGS. 14A and 14B graphically show various aberrations when the interchangeable lens of Example 4 of the present invention is focusing at an infinity and coma when focusing at the infinity upon vibration reduction respectively.

Figure 15A:
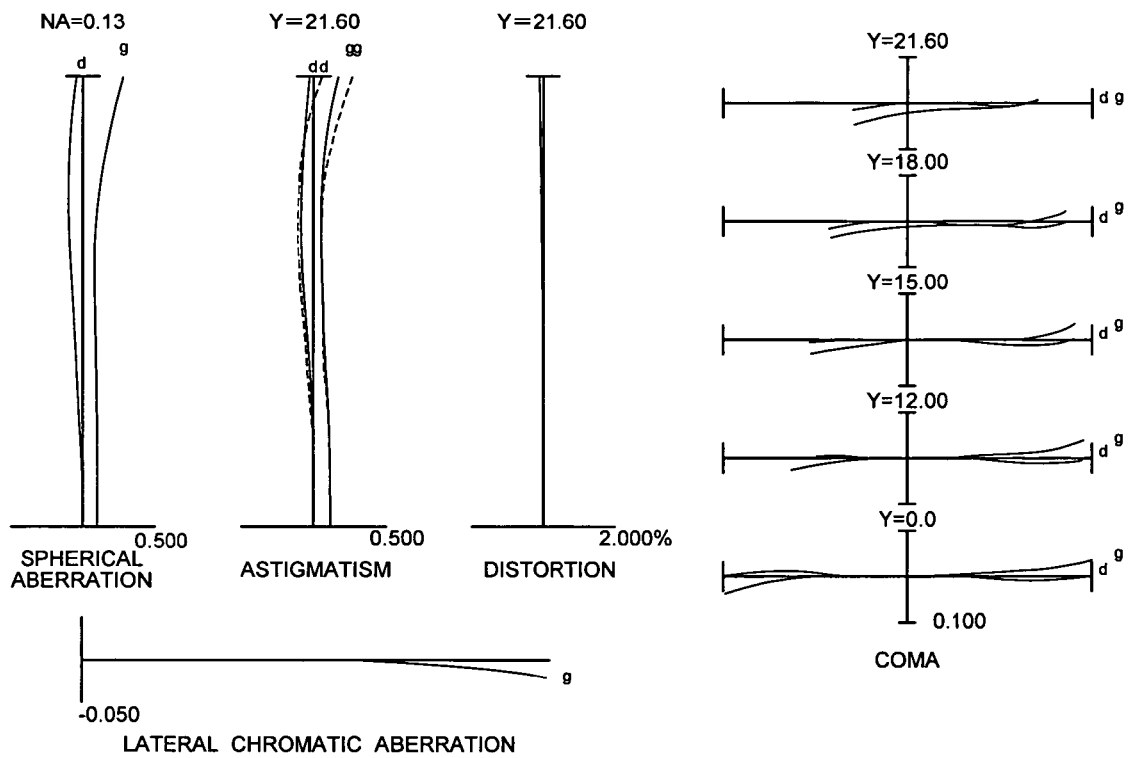
FIGS. 15A and 15B graphically show various aberrations when the interchangeable lens of Example 4 of the present invention is focusing at a close object (1/2×) and coma when focusing at a close object (1/2×) upon vibration reduction respectively.
Figure 15B:
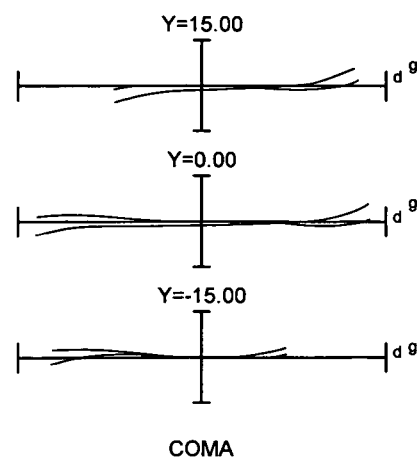

FIGS. 15A and 15B graphically show various aberrations when the interchangeable lens of Example 4 of the present invention is focusing at a close object (1/2×) and coma when focusing at a close object (1/2×) upon vibration reduction respectively.

Figure 16A:
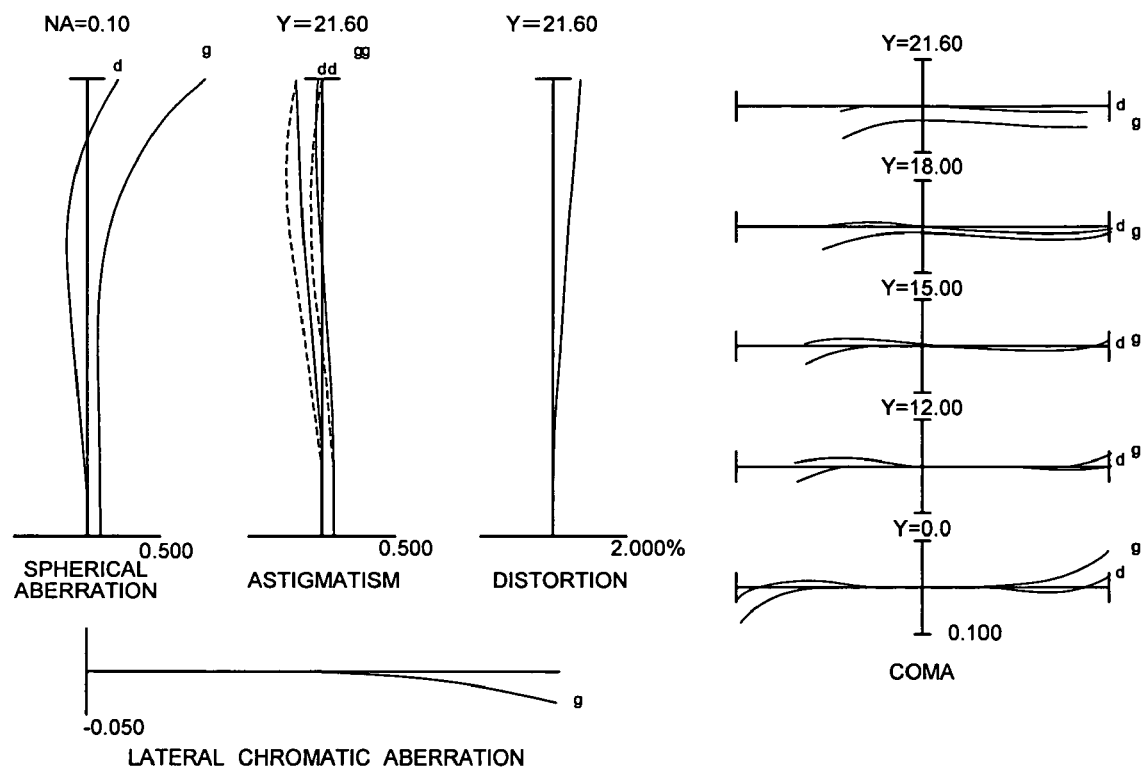
FIGS. 16A and 16B graphically show various aberrations when the interchangeable lens of Example 4 of the present invention is focusing at a close object (1/1×) and coma when focusing at a close object (1/1×) upon vibration reduction respectively.
Figure 16B:
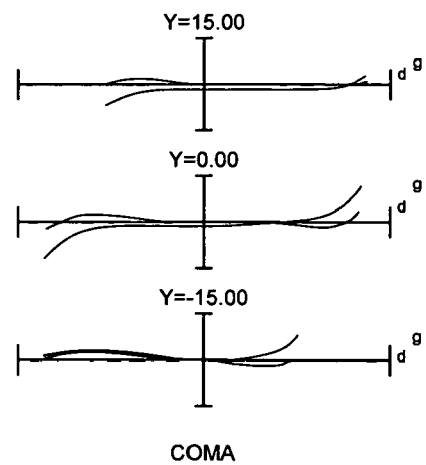

FIGS. 16A and 16B graphically show various aberrations when the interchangeable lens of Example 4 of the present invention is focusing at a close object (1/1×) and coma when focusing at a close object (1/1×) upon vibration reduction respectively.

Each graph showing various aberrations tells that the interchangeable lens according to Example 4 provides excellent imaging performance across the entire focusing range from infinity to a close distance of around the life size, and also excellent imaging performance even when the vibration reduction is activated.

According to the above-described each Example, the interchangeable lens can be provided that is capable of carrying out quick focus by way of the light-weight moving lens group from an object at infinity to a close distance object of around the life size, exhibiting superb imaging performance across the entire focusing range, and obtaining superb imaging performance by way of the vibration reduction lens and its drive system appropriately arranged within reason even at the time the vibration reduction is activated.

Although the interchangeable lens composed of the four groups is disclosed as the example of the present invention, it goes without saying that even a lens system with a lens or a lens group adding only to the lens is the same lens system having the effect of the present invention inherent in the present invention.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An interchangeable lens comprising, in order from an object side:
   a first lens group having positive refractive power;
   a second lens group having negative refractive power;
   a third lens group having positive refractive power; and
   a fourth lens group having negative refractive power,
   the fourth lens group including, in order from the object side, a front group having negative refractive power and a rear group having positive refractive power,
   wherein when the interchangeable lens is vibrated, the interchangeable lens corrects image blur by shifting the front group in a direction substantially perpendicular to an optical axis, and
   when focusing from infinity to a close object, the first lens group and the front group are fixed and at least the third lens group is moved toward the object side.

2. The interchangeable lens according to claim 1, wherein the following conditional expression is satisfied:

$$0.75 < f/(-f4) < 1.5$$

where f denotes a focal length of the overall interchangeable lens system when focusing on an object at infinity, and f4 denotes a focal length of the fourth lens group when focusing on an object at infinity.

3. The interchangeable lens according to claim 2, wherein the following conditional expression is satisfied:

$$1.90 < f/f3 < 4.0$$

where f denotes a focal length of the overall interchangeable lens system when focusing on an object at infinity, and f3 denotes a focal length of the third lens group when focusing on an object at infinity.

4. The interchangeable lens according to claim 2, wherein the following conditional expressions are satisfied:

$$1.60 < f/(-f4a) < 2.5$$

$$0.75 < f/f4b < 1.5$$

where f denotes a focal length of the overall interchangeable lens system when focusing on an object at infinity and f4a denotes a focal length of the front group when focusing on an object at infinity, and f4b denotes a focal length of the rear group when focusing on an object at infinity.

5. The interchangeable lens according to claim 2, further comprising:
   an aperture stop located between the second lens group and the third lens group,
   the aperture stop being fixed upon focusing.

6. The interchangeable lens according to claim 5, wherein a diameter of the aperture stop varies upon focusing.

7. The interchangeable lens according to claim 2, wherein the second lens group is further moved upon focusing from infinity to a close object.

8. The interchangeable lens according to claim 7, wherein the second lens group is monotonously moved toward an image side and the third lens group is monotonously moved toward the object side upon focusing from infinity to a close object.

9. The interchangeable lens according to claim 7, wherein the rear group in the fourth lens group is further moved upon focusing from infinity to a close object.

10. The interchangeable lens according to claim 1, wherein the front group comprises a cemented lens.

11. The interchangeable lens according to claim 10, wherein the following conditional expression is satisfied:

$$0.75 < f/(-f4) < 1.5$$

where f denotes a focal length of the overall interchangeable lens system when focusing on an object at infinity, and f4 denotes a focal length of the fourth lens group when focusing on an object at infinity.

12. The interchangeable lens according to claim 10, wherein the following conditional expression is satisfied:

$$1.90 < f/f3 < 4.0$$

where f denotes a focal length of the overall interchangeable lens system when focusing on an object at infinity, and f3 denotes a focal length of the third lens group when focusing on an object at infinity.

13. The interchangeable lens according to claim 10, wherein the following conditional expressions are satisfied:

$$1.60 < f/(-f4a) < 2.5$$

$$0.75 < f/f4b < 1.5$$

where f denotes a focal length of the overall interchangeable lens system when focusing on an object at infinity and f4a denotes a focal length of the front group when focusing on an object at infinity, and f4b denotes a focal length of the rear group when focusing on an object at infinity.

14. The interchangeable lens according to claim 10, further comprising:
   an aperture stop located between the second lens group and the third lens group,
   the aperture stop being fixed upon focusing.

15. The interchangeable lens according to claim 14, wherein a diameter of the aperture stop varies upon focusing.

16. The interchangeable lens according to claim 10, wherein the second lens group is further moved upon focusing from infinity to a close object.

17. The interchangeable lens according to claim 16, wherein the second lens group is monotonously moved toward an image side and the third lens group is monotonously moved toward the object side upon focusing from infinity to a close object.

18. The interchangeable lens according to claim 16, wherein the rear group in the fourth lens group is further moved upon focusing from infinity to a close object.

19. A method for forming an image of an object, comprising:
   providing an interchangeable lens that includes, in order from the object side, a first lens group having positive refractive power, a second lens group having negative refractive power, a third lens group having positive refractive power, and a fourth lens group having negative refractive power, wherein the fourth lens group has, in order from the object, a front group and a rear group;
   correcting an image blur by shifting the front group in a direction substantially perpendicular to an optical axis of the interchangeable lens without shifting the rear group in that direction; and
   carrying out focusing from infinity to a close object by moving at least the third lens group toward the object side without moving the first lens group or the front group.

20. The method according to claim 19, wherein the front group has negative refractive power and the rear group has positive refractive power.

21. The method according to claim 19, wherein the following conditional expression is satisfied:

$$0.75 < f/(-f4) < 1.5$$

where f denotes the focal length of the overall interchangeable lens system when focusing on an object at infinity, and f4 denotes a focal length of the fourth lens group when focusing on an object at infinity.

22. The method according to claim 19, wherein the front group comprises a cemented lens.

* * * * *

UNITED STATES PATENT AND TRADEMARK OFFICE
CERTIFICATE OF CORRECTION

PATENT NO. : 7,218,457 B2 Page 1 of 1
APPLICATION NO. : 11/237744
DATED : May 15, 2007
INVENTOR(S) : Takayuki Sensui It is certified that error appears in the above-identified patent and that said Letters Patent is hereby corrected as shown below:

On the Title Page:

Item (30) should read as follows:

(30) Foreign Application Priority Data
Sep. 30, 2004 (JP) ........................ 2004-289051

Signed and Sealed this

Twenty-seventh Day of November, 2007

JON W. DUDAS
*Director of the United States Patent and Trademark Office*